United States Patent
Zhou et al.

(10) Patent No.: US 9,277,592 B2
(45) Date of Patent: *Mar. 1, 2016

(54) SYSTEM FOR BEARER BINDING AND EVENT REPORTING FUNCTION RELOCATION AND METHOD THEREOF

(75) Inventors: Xiaoyun Zhou, Shenzhen (CN); Zaifeng Zong, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 903 days.

This patent is subject to a terminal disclaimer.

(21) Appl. No.: 13/258,893

(22) PCT Filed: Dec. 7, 2009

(86) PCT No.: PCT/CN2009/075373
§ 371 (c)(1),
(2), (4) Date: Jan. 20, 2012

(87) PCT Pub. No.: WO2011/009257
PCT Pub. Date: Jan. 27, 2011

(65) Prior Publication Data
US 2012/0110193 A1 May 3, 2012

(30) Foreign Application Priority Data
Jul. 20, 2009 (CN) .......................... 2009 1 0158597

(51) Int. Cl.
*G06F 15/16* (2006.01)
*H04W 92/24* (2009.01)
(Continued)

(52) U.S. Cl.
CPC ............... *H04W 92/24* (2013.01); *H04L 12/14* (2013.01); *H04M 15/66* (2013.01); *H04M 15/8038* (2013.01); *H04W 36/12* (2013.01); *H04W 76/021* (2013.01); *H04W 76/028* (2013.01)

(58) Field of Classification Search
CPC .. H04W 76/021; H04W 76/028; H04L 12/14; H04M 15/66; H04M 15/8038
USPC .......................................................... 709/227
See application file for complete search history.

(56) References Cited

U.S. PATENT DOCUMENTS 8,621,555 B2 * 12/2013 Zhou et al. ......................... 726/1
8,799,440 B2 * 8/2014 Zhou et al. ..................... 709/223
(Continued)

FOREIGN PATENT DOCUMENTS

CN     1321047 A    11/2001
EP     2339781 A1    6/2011
(Continued)

OTHER PUBLICATIONS

3GPP, 3GPP TS 23.203 V9.6.0, Sep. 2010, http://www.qtc.jp/3GPP/Specs/23203-960.pdf.*
International Search Report issued in corresponding PCT Application No. PCT/CN2009/075373 dated May 6, 2010 (4 pages).
"Policy and Charging Control Signalling Flow and Qos Parameter Mapping"; Release 8; 3GPP TS 29.213 V8.4.0; www.3gpp.org; May 31, 2009; p. 2 line4-p. 51 line 35.
(Continued)

*Primary Examiner* — Jeong S Park
*Assistant Examiner* — James Conaway
(74) *Attorney, Agent, or Firm* — McClure, Qualey & Rodack, LLP

(57) ABSTRACT

The present invention discloses a method for a bearer binding and event report function relocation so as to implement deferred linking of the policy and charging control session in the roaming scenario. The present invention implements the deferred linking of the policy and charging control session in roaming scenarios of home roaming and local breakout by establishing a new subsession of the S9 session between a visited PCRF and a home PCRF in a process of the BBERF relocation, and linking the new subsession of the S9 session to the Gxx session established between the destination BBERF and the visited PCRF and the corresponding Gx session.

18 Claims, 11 Drawing Sheets

(51) Int. Cl.
*H04M 15/00* (2006.01)
*H04W 76/02* (2009.01)
*H04L 12/14* (2006.01)
*H04W 36/12* (2009.01)

(56) References Cited

U.S. PATENT DOCUMENTS

| | | | |
|---|---|---|---|
| 8,832,208 B2 * | 9/2014 | Kopplin et al. | 709/206 |
| 8,943,165 B2 * | 1/2015 | Zhou et al. | 709/217 |
| 2012/0117251 A1 * | 5/2012 | Zhou et al. | 709/227 |
| 2012/0158977 A1 * | 6/2012 | Zhou et al. | 709/228 |

FOREIGN PATENT DOCUMENTS

| | | | |
|---|---|---|---|
| EP | 2445159 | A1 | 4/2012 |
| EP | 2458914 | A1 | 5/2012 |

OTHER PUBLICATIONS

"Policy and Charging Control (PCC) Over S9 Reference Point"; (Stage 3) Release 8; 3 GPP TS 29.215 V8.0.2; www.3gpp.org; Jan. 31, 2009; p. 11 line 36-p. 18 line 7.

Change Request for "Incompatability between Alternative B in handover flows to 3GPP and MUPSAP"; Samsung; 3GPP TSG SA WG2 Meeting #74; Sophia Antipolis, France, Jul. 6-10, 2009; pp. 1-9.

Ericsson: "MUPSAP impacts on PCC"; 3GPP TSG SA WG2 Meeting #73, May 11-15, 2009, Tallinn, Estonia; pp. 1-3.

"3rd Generation Partnership Project; Technical Specification Group Services and System Aspects: Policy and charging control architecture"; Release 9; 3GPP TS 23.203 V9.1.0 (Jun. 2009); pp. 1-116.

EP Search Report dated May 29, 2015 in corresponding EP application (No. 09847492.7).

* cited by examiner

SYSTEM FOR BEARER BINDING AND EVENT REPORTING FUNCTION RELOCATION AND METHOD THEREOF

TECHNICAL FIELD

The present invention relates to the communication field, and in particular, to a system and a method for a bearer binding and event report function relocation.

BACKGROUND OF THE RELATED ART

The Evolved Packet System (EPS) of the 3rd Generation Partnership Project (3GPP) is composed of an Evolved Universal Terrestrial Radio Access Network (E-UTRAN), a Mobility Management Entity (MME), a Serving Gateway (S-GW), a Packet Data Network Gateway (P-GW, PDN GW), a Home Subscriber Server (HSS), a 3GPP Authentication Authorization Account (AAA) server, a Policy and Charging Rules Function (PCRF) entity and other support nodes.

FIG. 1 is a structural diagram of the existing EPS system in the related art. As shown in FIG. 1, in this structural diagram, the MME is responsible for the related work at the control plane, such as mobility management, processing of non-access stratum signaling and management of user mobile management context. The S-GW, which is an access gateway device connected to the E-UTRAN, is used to forward data between the E-UTRAN and the P-GW and is responsible for caching paging waiting data. The P-GW, which is a border gateway between the EPS and a Packet Data Network (PDN), is responsible for functions, such as access of the PDN and forwarding of data between the EPS and the PDN.

The EPS supports the interworking with the non-3GPP network, i.e., it implements the interworking with the non-3GPP network through S2a/b/c interfaces. The non-3GPP network includes the trusted non-3GPP network and untrusted non-3GPP network. The Internet Protocol (IP) access of the trusted non-3GPP network can be directly connected to the P-GW through an S2a interface; the IP access of the untrusted non-3GPP network is required to be connected to the P-GW through an Evolved Packet Data Gateway (ePDG), which is connected to the P-GW through an S2b interface.

If the EPS system supports Policy and Charging Control (PCC), then the PCRF makes policy and charging rules. The PCRF is connected to an IP service network of an operator through a receiving interface Rx, and obtains service information. In addition, the PCRF, connected to a gateway device in the network through Gx/Gxa/Gxc interfaces, is responsible for initiating the establishment of an IP bearer, ensuring the Quality of Service (QoS) of service data, and performing charging control. The Policy and Charging Execution Function (PCEF) is situated in the P-GW, and the PCRF exchanges information with the P-GW through a Gx interface. When an interface between the P-GW and the S-GW is based on Proxy Mobile IP (PMIP), Bearer Binding and Event Report Function (BBERF) exists in the S-GW, and the S-GW exchanges information with the PCRF through a Gxc interface. Upon access through the trusted non-3GPP network, the BBERF also resides in a trusted non-3GPP access gateway, the access gateway of the trusted non-3GPP network exchanges information with the PCRF through a Gxa interface. When a User Equipment (UE) is roaming, an interface between a home PCRF and a visited PCRF is an S9 interface, while an Application Function (AF) providing services for the UE is situated in a service network and sends service information used for generating the PCC policy to the PCRF via an Rx interface.

In the existing technology, a protocol used in a PCC architecture is a Diameter application protocol developed based on the Diameter Base Protocol, such as an application protocol applied to a Gx interface, an application protocol applied to an Rx interface, an application protocol applied to a Gxx interface (including Gxa and Gxc interfaces) and an application protocol applied to a roaming interface S9. Messages, commands and Attribute Value Pairs (AVP) used for the PCC are defined in these application protocols. Diameter sessions established using these protocols may be called as Gx session, Gxx session, Rx session and S9 session, respectively. Various function entities of the PCC perform, through these sessions, policy and charging control on a PDN connection established for the UE to access to the network. Generally, one IP connection from the UE to the PDN network is called as one IP Connectivity Access Network (IP-CAN) session. One important operation executed by the PCRF is to link the Gx session, gateway control session (Gxx session) and S9 session performing policy control on the same IP-CAN session to each other. The linking operation is performed during establishment and modification of the IP-CAN session. The above Diameter sessions are called herein as policy and charging control session.

FIG. 2 is a flow chart of an initial attachment process in which a UE accesses to the EPS via the E-UTRAN and establishes a PDN connection (i.e., IP-CAN session). The PMIPv6 protocol is used between an S-GW and a P-GW. The process shown in FIG. 2 mainly comprises the following steps.

Step S201, the UE sends an attachment request message to an eNodeB (envolved NodeB, eNB for short) to request access to to the EPS.

Step S202, the eNodeB sends the attachment request message to an MME.

Step S203, a network authenticates the UE and starts Non-Access Stratum (NAS) security encryption protection.

Step S204, the MME interacts with a HSS after the authentication of the UE is passed, and performs a location update process.

Step S205, the MME selects the P-GW for the UE based on a default Access Point Name (APN) subscribed by a user, selects an S-GW, and sends an establishment default bearer request message to the selected S-GW; "APN" is used to denote the "default APN" hereinafter in the case of no ambiguity.

Step S206, a BBERF located in the S-GW sends a gateway control session establishment indication message containing a user identifier NAI (Network Access Identifier), a PDN identifier APN and a bearer attribute of the current access network to a PCRF; the gateway control session (Gxx session) that this message requests to establish is denoted as Gxx session1.

The bearer attribute of the access network includes IP-CAN type and BBERF address; in addition, the bearer attribute of the access network may further include Radio Access Technology (RAT) type.

Step S207, the PCRF obtains subscription information of the user based on the user identifier NM and the PDN identifier APN so as to make policies based on the subscription information of the user, the network policies, and the bearer attribute (including IP-CAN type, or IP-CAN type and RAT type) of the current access network. At this point, the policies made by the PCRF are the default policies for the user to access to this APN, including PCC rules, QoS rules and an event trigger.

The PCRF returns a gateway control session establishment acknowledgement message to the BBERF, and sends the made QoS rules and the event trigger to the BBERF; and the BBERF installs and performs the QoS rules and the event trigger.

Step S208, the S-GW sends a proxy binding update message containing the user identifier NM, the PDN identifier APN and the bearer attribute (including IP-CAN type, or IP-CAN type and RAT type) of the access network to the P-GW selected by the MME in step S205.

Step S209, the P-GW allocates an IP address, which is denoted as IP Address1, to a PDN connection that is requested to be established by the UE for access.

The PCEF located in the P-GW sends an IP-CAN session establishment indication message containing the user identifier NAI, PDN identifier APN, IP Address1, and bearer attribute (including IP-CAN type, or IP-CAN type and RAT type) of the access network to the PCRF; the bearer attribute of the access network in this message is obtained in step S208; the Gx session that this message request to establish is denoted as Gx session1.

Step S210, the PCRF links Gxx session1 to Gx session1 based on the NAI and APN, i.e., Gxx session1 and Gx session1 are used for performing policy and charging control on the PDN connection (i.e., IP-CAN session) which is requested to be established by the UE.

Step S211, the PCRF returns an IP-CAN session establishment acknowledgement message to the PCEF, and sends the PCC rules and the event trigger made in step S207 to the PCEF; the PCEF installs and performs the PCC rules and the event trigger.

The PCRF might modify the PCC rules and QoS rules based on the bearer attribute of the access network reported in step S209, and at this point, the PCRF will send the modified PCC rules and QoS rules to the PCEF and BBERF respectively for updating.

Step S212, the P-GW returns a proxy binding acknowledgement message containing IP Address1 to the S-GW.

Step S213, the S-GW returns an establishment default bearer reply message containing IF Address1 to the MME.

Step S214, the MME returns an attachment acceptance message containing IP Address1 to the eNodeB.

Step S215, the eNodeB returns the attachment acceptance message containing IP Address1 to the UE.

Step S216, the UE sends an attachment completion message to the eNodeB.

Step S217, the eNodeB sends the attachment completion message to the MME.

Step S218, the MME and the S-GW perform an interaction process of updating the bearer.

Step S219, the MME knows that the UE can access through the non-3GPP system based on the subscription information of the user, and thus sends the address of the P-GW selected when the UE establishes the PDN connection (i.e., IP-CAN session) to the HSS, which stores the address of the P-GW and then returns a reply message.

The UE establishes the PDN connection (i.e., IP-CAN session) to the default APN through the process shown in FIG. 2; afterwards, the UE can access dedicated services through this connection. The PCRF will make the PCC rules and QoS rules based on information, such as service features, the subscription information of the user, the network policies and the bearer attribute of the access network. Since the linking is performed in step S210, the PCRF can send the PCC rules to the PCEF via Gx session1 and sends the QoS rules to the BBERF via Gxx session1. When the BBERF requests new QoS rules or modifies the QoS rules via Gxx session1, the PCRF will also make the corresponding PCC rules or modify the corresponding PCC rules, and send the corresponding PCC rules to the PCEF via Gx session1; or vice versa.

When handover across systems or handover across S-GWs (i.e., BBERF reselection) occurs in the UE, the PCRF is required to perform a new linking operation.

FIG. 3 is a flow chart of handover from the E-UTRAN to the trusted non-3GPP access system after a UE accesses to the EPS using the process shown in FIG. 2. In the case of the non-3GPP access, the PMIPv6 protocol is used between a trusted non-3GPP access gateway and a P-GW. The process shown in FIG. 3 mainly comprises the following steps.

Step S301, the UE establishes a PDN connection (i.e., IP-CAN session) through the 3GPP access, and there is a PMIPv6 tunnel between the S-GW and the P-GW.

Step S302, the UE finds the trusted non-3GPP access system and decides handover of the current session from the 3GPP access system to the trusted non-3GPP access system.

Step S303, the UE, trusted non-3GPP access gateway and HSS/AAA perform an Extensible Authentication Protocol (EAP) authentication process, in which the HSS/AAA returns the address of the P-GW selected by the UE during the 3GPP access to the trusted non-3GPP access gateway.

Step S304, a layer 3 attachment process specific to the non-3GPP access is triggered upon success of the authentication; in this process, the UE indicates the network that the UE has IP address keeping capability.

Step S305, a BBERF located in the trusted non-3GPP access gateway sends a gateway control session establishment indication message containing a user identifier NM, PDN identifier APN and bearer attribute (including new IP-CAN type, or new IP-CAN type and new RAT type) of the current access network to a PCRF; the gateway control session (Gxx session) that this message requests to establish is denoted as Gxx session2.

Step S306, the PCRF links Gxx session2 to Gx session1 established in the process shown in FIG. 2 based on the NAI and APN.

Step S307, the PCRF makes QoS rules and an event trigger, including the dedicated policy made by the PCRF for the UE when the UE accesses the dedicated service through 3GPP access, for the UE to access through the 3GPP system based on subscription information of a user, network policies, and the bearer attribute of the current access network.

The PCRF sends the above QoS rules and event trigger to the BBERF through a gateway control session establishment acknowledgement message; the BBERF installs and performs the QoS rules and the event trigger; the trusted non-3GPP access gateway performs the specific non-3GPP access process for resource reservation.

Step S308, the trusted non-3GPP access gateway sends a proxy binding update message containing the user identifier NAI, the PDN identifier APN and the bearer attribute (including IP-CAN type, or IP-CAN type and RAT type) of the current access network to the corresponding P-GW based on the address of the P-GW obtained in step S303.

Step S309, the P-GW allocates an IP address (i.e., IP Address1) used when the UE accesses to the network via the 3GPP system to the UE based on the NAT and APN so as to keep the IP address unchanged and further ensure the service continuity.

The PCEF located in the P-GW sends an IP-CAN session modification indication message containing a new bearer attribute of the access network obtained in step S308 to the PCRF; modified by this message is Gx session1 established in the process shown in FIG. 2.

Step S310, the PCRF determines that handover (i.e., handover from the 3GPP to the non-3GPP) occurs in the tunnel of the PDN connection (i.e., IP-CAN session) established by the UE, and therefore, the PCRF modifies the PCC rules for the reestablished PDN connection (i.e., IP-CAN session) based on the new bearer attribute of the access network, and returns the modified PCC rules to the PCEF through an IP-CAN session modification acknowledgement message for updating.

Step S311, the P-GW returns a proxy binding acknowledgement message containing IP Address1 to the trusted non-3GPP access gateway.

Step S312, the trusted non-3GPP access gateway returns a layer 3 attachment completion message containing IP Address1 to the UE.

Step S313, the UE performs the handover of the PDN connection from the 3GPP access to the trusted non-3GPP access, and there is a PMIPv6 tunnel (this PMIPv6 tunnel is established in steps S308 and S311) between the trusted non-3GPP access gateway and the P-GW; all the services accessed by the UE through the 3GPP access can be continued to be accessed.

It can be seen from the process shown in FIG. 3 that the PCRF links the new Gxx session to one established PDN connection (IP-CAN session) based on the NM and APN, and the PCRF can further update the policies made by the PCRF when the UE access through the 3GPP system based on the new bearer attribute of the access network to send to the new BBERF through the new gateway control session (Gxx session), thereby ensuring that the non-3GPP access system has performed resource reservation for services that are previously accessed by the UE before the handover occurs in the PMIPv6 tunnel (i.e., before step S308), and thus the handover speed is accelerated, and the user experience is improved.

However, not all UEs can perform the handover process (i.e., keep the IP address unchanged). When the network is not sure whether the UE has the network mobility capability (i.e., the IP address keeping capability), the P-GW decides whether to allocate a new IP address (i.e., establish a new PDN connection) to the UE or keep the IP address unchanged (i.e., handover of the established PDN). However, the P-GW makes this decision after receiving the proxy binding update message sent by the trusted non-3GPP access gateway. At this point, the PCRF has made a decision of linking the new gateway control session (Gxx session) to the existing PDN connection (i.e., the PCRF has made the decision of handover). If at this point the P-GW decides to establish a new PDN connection without handover, then the inconsistency of the policy sent by the PCRF with the decision of the p-GW will be certainly resulted in, causing occurrence of errors. A method for solving this problem in the existing technoly will be described below.

(1) When the access gateway is unable to determine whether the UE has the network mobility capability, a gateway control session establishment indication message containing a deferred linking indication is sent to the PCRF by the BBERF located in the access gateway. The PCRF does not immediately link the established gateway control session (Gxx session) (i.e., Gxx session2 in FIG. 2) to the existing PDN connection (IP-CAN session) after receiving the deferred linking indication.

(2) If the P-GW decides to perform handover, the PCEF located in the P-GW sends an IP-CAN session modification indication message to the PCRF to modify the established Gx session (i.e., Gx session1 in FIG. 3), and, at this point, links the newly established gateway control session (Gxx session) (i.e., Gxx session2) to the established PDN connection (IP-CAN session) (i.e., links Gxx session2 to Gx session1).

(3) If the P-GW decides to establish newly one PDN connection (IP-CAN session) instead of performing the handover, then the P-GW allocates a new IP address (which is denoted as IP Address2) to the UE. The PCEF located in the P-GW sends an IP-CAN session establishment indication message containing the user identifier NAI, the PDN identifier APN and IP Address2 to the PCRF to request to establish a new Gx session (which is denoted as Gx session2). At this point, the PCRF decides to link the newly established gateway control session (Gxx session) to the newly established Gx session (i.e., links Gxx session2 to Gx session2). In this case, the dedicated services that are previously accessed by the UE through the 3GPP access will be interrupted, thus the UE is required to reinitiate a service request, and the PCRF remakes the policies for the UE.

The above way of not immediately linking the established gateway control session to the existing PDN connection is called as deferred linking.

Only a method for implementing session deferred linking of policy and charging control in a non-roaming scenario is discussed in the existing technology. A roaming scenario has not yet involved in the existing technology.

There are two roaming architectures for the EPS, the first one is home routed, and the second one is local breakout. FIG. 4 is a roaming structure diagram of the EPS for home routed in the existing technology. As shown in FIG. 4, a P-GW is in a home network, and IP services are provided by a home network operator (i.e., an AF is in the home network). FIG. 5 is a roaming structure diagram of the EPS for local breakout in the existing technology. As shown in FIG. 5, a P-GW is in a visited network, and IP services can be provided by a home network operator (i.e., an AF is in a home network) or a visited network operator (i.e., an AF is in the visited network). For different roaming scenarios, processes of the PCC are different, and functions performed by PCC network elements are also different.

At present, in a scheme for implementing an S9 roaming interface, a Visited PCRF (vPCRF for short) terminates Gx sessions and gateway control sessions (Gxx sessions) of all IP-CAN sessions established by the UE existing in the visited network, i.e., establishes one S9 session between the vPCRF and a Home PCRF (hPCRF) instead of sending the gateway control sessions (Gxx sessions) and Gx sessions to the hPCRF, and transmits information on the Gx sessions and Gxx sessions of all the IP-CAN sessions using this S9 session. However, the vPCFF does not terminate the Rx sessions of all the IP-CAN sessions in the visited network, and only forwards messages of the Rx sessions to the home PCRF, and uses the vPCRF as one proxy. A plurality of subsessions (which is called as S9 Subsession) might exist in one S9 session, each subsession being used for transmitting information on the Gx session and gateway control session (Gxx session) of one IP-CAN session.

In summary, due to the complexity of the roaming scenarios of the EPS and the complexity of deferred linking of the policy and charging control session itself in the roaming scenario, there are difficulties in the method for implementing the deferred linking of the policy and charging control session and the policy and charging control thereon, and there has not a corresponding solution yet in the existing technology.

SUMMARY OF THE INVENTION

A technical problem to be solved by the present invention is to overcome drawbacks in the existing technology and provide a system and a method for implementing relocation of a bearer binding and event report function in a roaming scenario of an EPS so as to implement deferred linking of policy and charging control session in the roaming scenario.

In order to solve the above problem, the present invention first provides a method for a Bearer Binding and Event Report Function (BBERF) relocation comprising: after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation:

establishing a second subsession of the S9 session between a visited Policy and Charging Rule Function (PCRF) and a home PCRF, and linking a second gateway control session established between a destination BBERF and the visited PCRF to the second subsession;

if an IP-CAN session modification indication message sent by a Policy and Charging Execution Function (PCEF) is received, then the home PCRF linking the first Gx session that the IP-CAN session modification indication message requests to modify to the second subsession based on session identifier information contained in the IP-CAN session modification indication message; or if an IP-CAN session establishment indication message sent by the PCEF is received, then the home PCRF linking a second Gx session that the IP-CAN session establishment indication message requests to establish to the second subsession based on session identifier information contained in the IP-CAN session establishment indication message.

Further, after receiving a gateway control session establishment indication message sent by the destination BBERF, the visited PCRF establishes the second subsession with the home PCRF based on a deferred linking indication and session identifier information contained in the gateway control session establishment indication message, and links the second gateway control session that the gateway control session establishment indication message requests to establish to the second subsession.

Further, the visited PCRF establishes the second subsession by sending an S9 session modification indication message containing the deferred linking indication and session identifier information to the home PCRF;

after receiving the S9 session modification indication message, the home PCRF sends an S9 session modification acknowledgement message containing a default Quality of Service (QoS) policy made for a user to the visited PCRF based on the deferred linking indication and session identifier information; and after receiving the S9 session modification acknowledgement message, the visited PCRF sends a gateway control session establishment acknowledgement message containing the default QoS policy to the destination BBERF.

Further, after linking the first Gx session to the second subsession, the home PCRF sends a Policy and Charging Control (PCC) policy made for the user to the PCEF through the first Gx session and sends the QoS policy made for the user to the visited PCRF through the second subsession, and the visited PCRF sends the QoS policy to the destination BBERF through the second gateway control session; or after linking the second Gx session to the second subsession, the home PCRF sends the PCC policy made for the user to the PCEF through the second Gx session and sends the QoS policy made for the user to the visited PCRF through the second subsession, and the visited PCRF sends the QoS policy to the destination BBERF through the second gateway control session.

Further, the session identifier information contains a user identifier and a packet data network identifier.

The present invention further provides a method for a Bearer Binding and Event Report Function (BBERF) relocation comprising: after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation:

establishing a second gateway control session between a visited Policy and Charging Rule Function (PCRF) and a home PCRF;

if an IP-CAN session modification indication message sent by a Policy and Charging Execution Function (PCEF) is received, then the visited PCRF linking the first Gx session that the IP-CAN session modification indication message requests to modify to the second gateway control session based on session identifier information contained in the IP-CAN session modification indication message, establishing a second subsession of the S9 session with the home PCRF, and obtaining a policy modified by the home PCRF for a user through the second subsession; or if an IP-CAN session establishment indication message sent by the PCEF is received, then the visited PCRF linking a second Gx session that the IP-CAN session establishment indication message requests to establish to the second gateway control session based on session identifier information contained in the IP-CAN session establishment indication message, establishing the second subsession of the S9 session with the home PCRF, and obtaining a policy newly made by the home PCRF for the user through the second subsession.

Further, the policy modified or newly made by the home PCRF contains Policy and Charging Control (PCC) rules and Quality of Service (QoS) rules.

After obtaining the policy modified or newly made by the home PCRF through the second subsession, the visited PCRF sends the PCC rules in the policy to the PCEF through the first Gx session, and sends the QoS rules in the policy to the destination BBERF through the second gateway control session.

Further, the policy modified or newly made by the home PCRF contains Policy and Charging Control (PCC) rules.

After obtaining the PCC rules modified or newly made by the home PCRF through the second subsession, the visited PCRF sends the PCC rules to the PCEF through the first Gx session, makes corresponding Quality of Service (QoS) rules based on the PCC rules, and sends the QoS rules to the destination BBERF through the second gateway control session.

Further, after receiving the IP-CAN session modification indication message, the visited PCRF establishes the second subsession by sending an S9 session modification indication message containing an execution indication to the home PCRF, the execution indication being used for indicating the home PCRF to modify a policy for the user; after receiving the S9 session modification indication message, the home PCRF sends an S9 session modification acknowledgement message containing the policy modified for the user to the visited PCRF based on the execution indication; or after receiving the IP-CAN session establishment indication message, the visited PCRF establishes the second subsession by sending an S9 session modification indication message containing the execution indication to the home PCRF, the execution indication being used for indicating the home PCRF to make a policy for the user; after receiving the S9 session modification indication message, the home PCRF sends an S9 session modification acknowledgement message containing the policy made for the user to the visited PCRF based on the execution indication.

Further, the destination BBERF establishes the second gateway control session by sending a gateway control session establishment indication message containing a deferred linking indication, a bearer attribute of an access network, and session identifier information to the visited PCRF; and after receiving the gateway control session establishment indication message, the visited PCRF searches default Quality of Service (QoS) rules corresponding to the session identifier information based on the deferred linking indication, and modifies the default QoS rules based on the bearer attribute of the access network to send to the destination BBERF through a gateway control session establishment acknowledgement message.

Further, the session identifier information contains a user identifier and a packet data network identifier.

The present invention protides a system for a Bearer Binding and Event Report Function (BBERF) relocation comprising a visited Policy and Charging Rule Function (PCRF), a home PCRF and a Policy and Charging Execution Function (PCEF), wherein after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation:

the visited PCRF is configured to establish a second subsession of the S9 session with the home PCRF, establish a second gateway control session with a destination BBERF, and link the second gateway control session to the second subsession;

the PCEF is configured to send an IP-CAN session modification indication message or an IP-CAN session establishment indication message to the home PCRF; and the home PCRF is configured to link the first Gx session that the IP-CAN session modification indication message requests to modify to the second subsession based on session identifier information contained in the IP-CAN session modification indication message; and link a second Gx session that the IP-CAN session establishment indication message requests to establish to the second subsession based on session identifier information contained in the IP-CAN session establishment indication message.

The present invention further procides a system for a Bearer Binding and Event Report Function (BBERF) relocation comprising a visited Policy and Charging Rule Function (PCRF), a home PCRF and a Policy and Charging Execution Function (PCEF), wherein after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation:

the PCEF is configured to send an IP-CAN session modification indication message or an IP-CAN session establishment indication message to the visited PCRF;

the visited PCRF is configured to establish a second gateway control session with a destination BBERF, and link the first Gx session that the IP-CAN session modification indication message requests to modify to the second gateway control session based on session identifier information contained in the IP-CAN session modification indication message; and establish a second subsession of the S9 session with the home PCRF, and obtain a policy modified by the home PCRF for a user through the second subsession; and link the second Gx session that the IP-CAN session establishment indication message requests to establish to the second gateway control session based on session identifier information contained in the IP-CAN session establishment indication message, and establish the second subsession of the S9 session with the home PCRF, and obtain a policy newly made by the home PCRF for the user through the second subsession;

the home PCRF is configured to newly make the policy for the user and establish the second subsession of the S9 session with the visited PCRF.

In conclusion, the present invention implements deferred linking of the policy and charging control session in the roaming scenario of the home roaming and local breakout by establishing a new subsession of the S9 session between the visited PCRF and the home PCRF in the process of the BBERF relocation, and linking the new subsession of the S9 session to the gateway control session (Gxx session) established between the destination BBERF and the visited PCRF and the corresponding Gx session.

Other features and advantages of the present invention will be described hereinafter, and will become apparent partly from the description and be understood by practicing the present invention. Objects and other advantages of the present invention can be implemented and obtained by structures particularly specified in the specification, claims and accompanying drawings.

BRIEF DESCRIPTION OF DRAWINGS

Accompanying drawings, which provide further comprehension of the present invention and form a part of the specification, are used for explaining the present invention, along with embodiments of the present invention, and do not constitute limitations of the present invention. In the drawings.

PREFERRED EMBODIMENTS OF THE PRESENT INVENTION

Embodiments of the present invention will be described in detail below in conjunction with the accompanying drawings and examples, whereby the technique problem of the present invention is solved by using the technical means such that the implementation process for achieving technical effects can be fully understood and practised.

It should be noted that the embodiments and various features of the embodiments of the present invention may be combined in the case of no conflict, which is within the protection scope of the present invention. In addition, steps shown in a flow chart of drawings may be executed in a computer system using a set of compute executable instructions, for example. Furthermore, although the logical order is shown in the flow chart, the steps shown or illustrated may be executed in an order different from that herein in some cases.

The core concept of the present invention is to establish a new subsession of an S9 session between a visited PCRF and home PCRF during reselection of a BBERF, and link a gateway control session (Gxx session) established between a destination BBERF and the visited PCRF to the subsession, while linking a Gx session that an IP-CAN session establishment indication message requests to establish or a Gx session that the IP-CAN session modification indication message requests to modify, sent by a PCEF, to a newly established subsession of the S9 session based on session identifier information (including a user identifier and a PDN identifier).

A method for implementing deferred linking of policy and charging control session in different roaming scenarios in accordance with the present inventions will be described in detail below in conjunction with the accompanying drawings and examples.

Example 1

Figure 1:
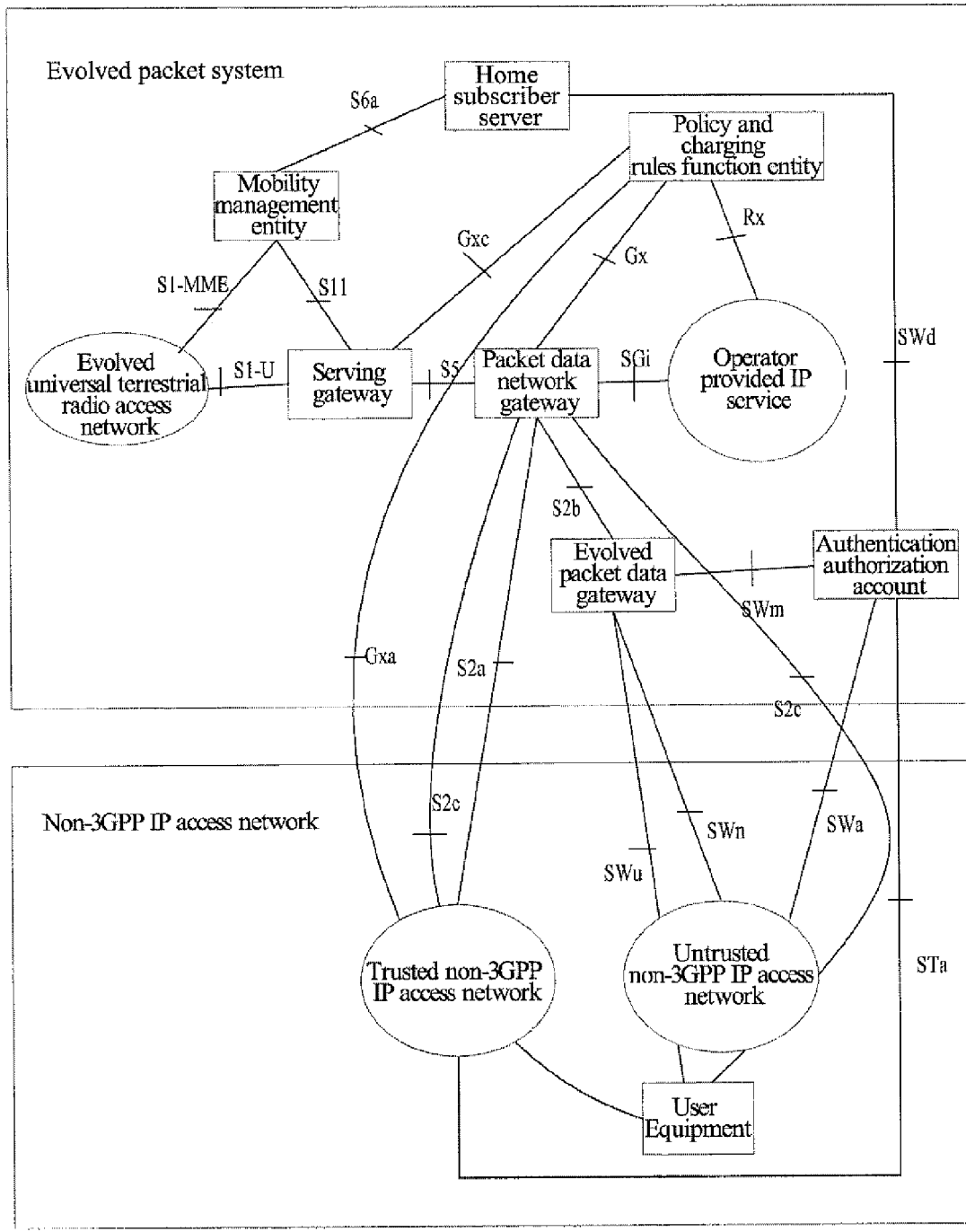
FIG. 1 is a structural diagram of the existing EPS system in the related art.
Figure 2:
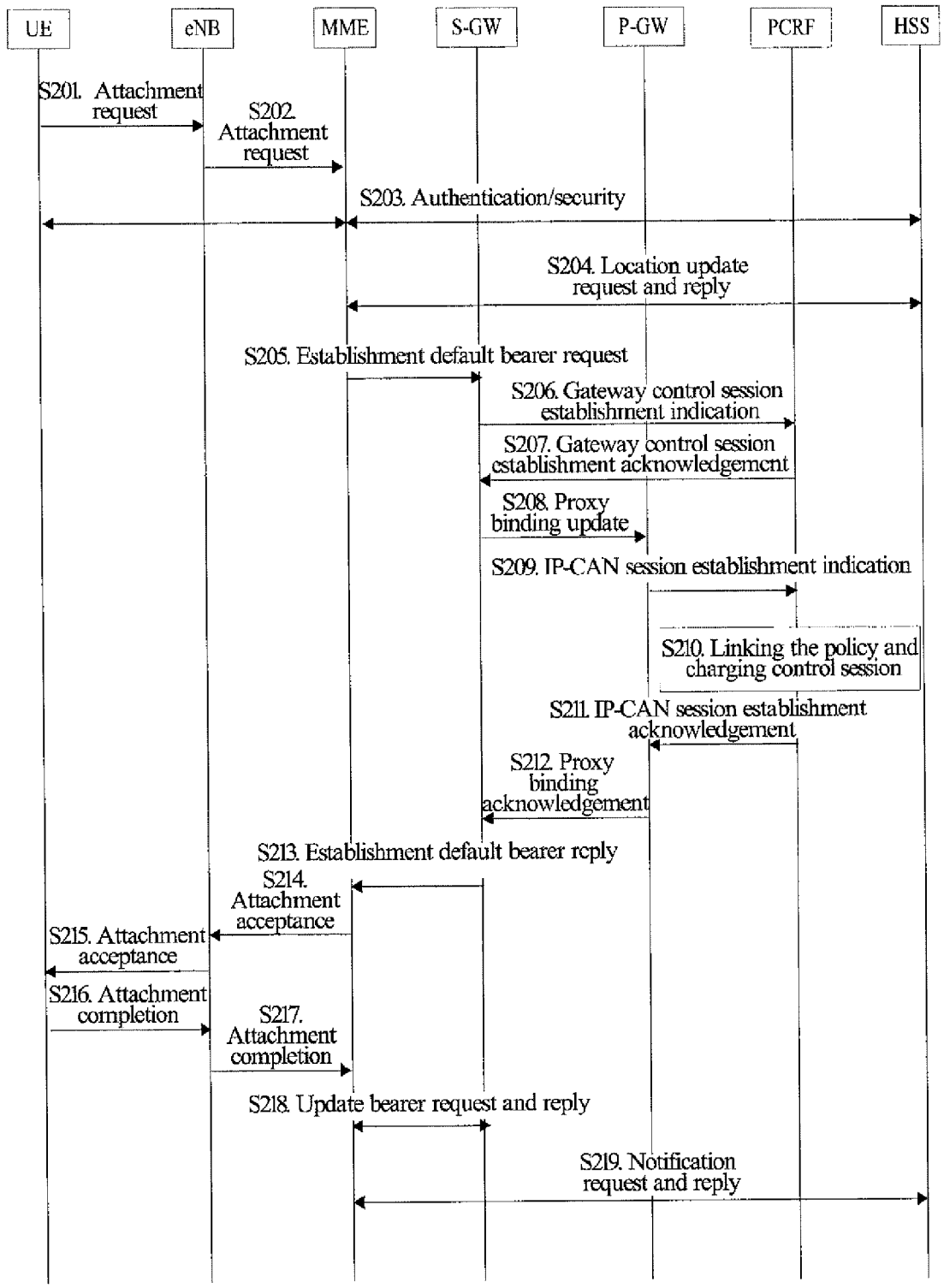
FIG. 2 is a flow chart of an initial attachment process in which a UE accesses to the EPS via the E-UTRAN and establishes a PDN connection.
Figure 3:
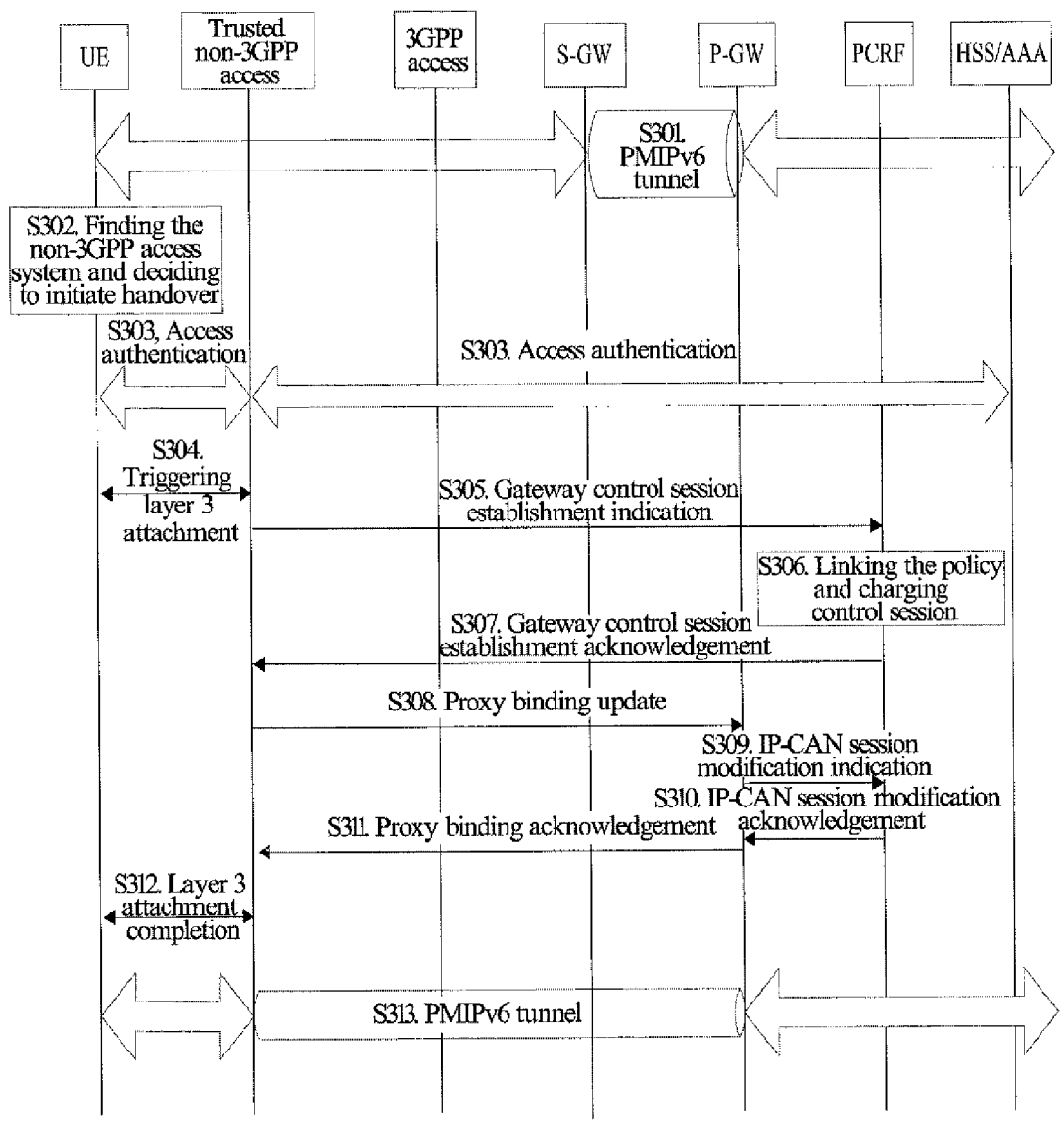
FIG. 3 is a flow chart of handover from the E-UTRAN to the trusted non-3GPP access system after a UE accesses to the EPS using the process shown in FIG. 2.
Figure 4:
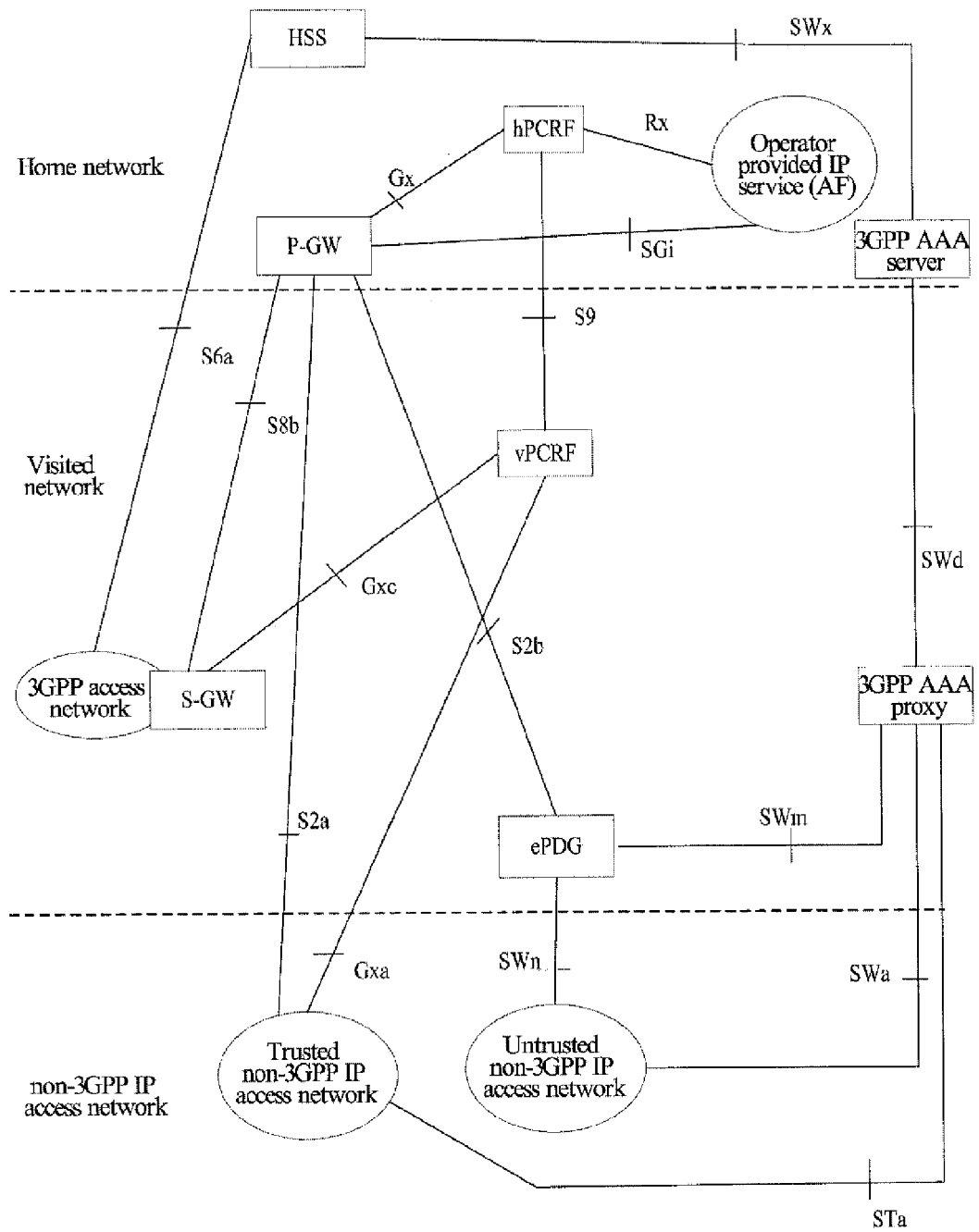
FIG. 4 is a roaming structure diagram of the EPS for home routed in the existing technology.
Figure 5:
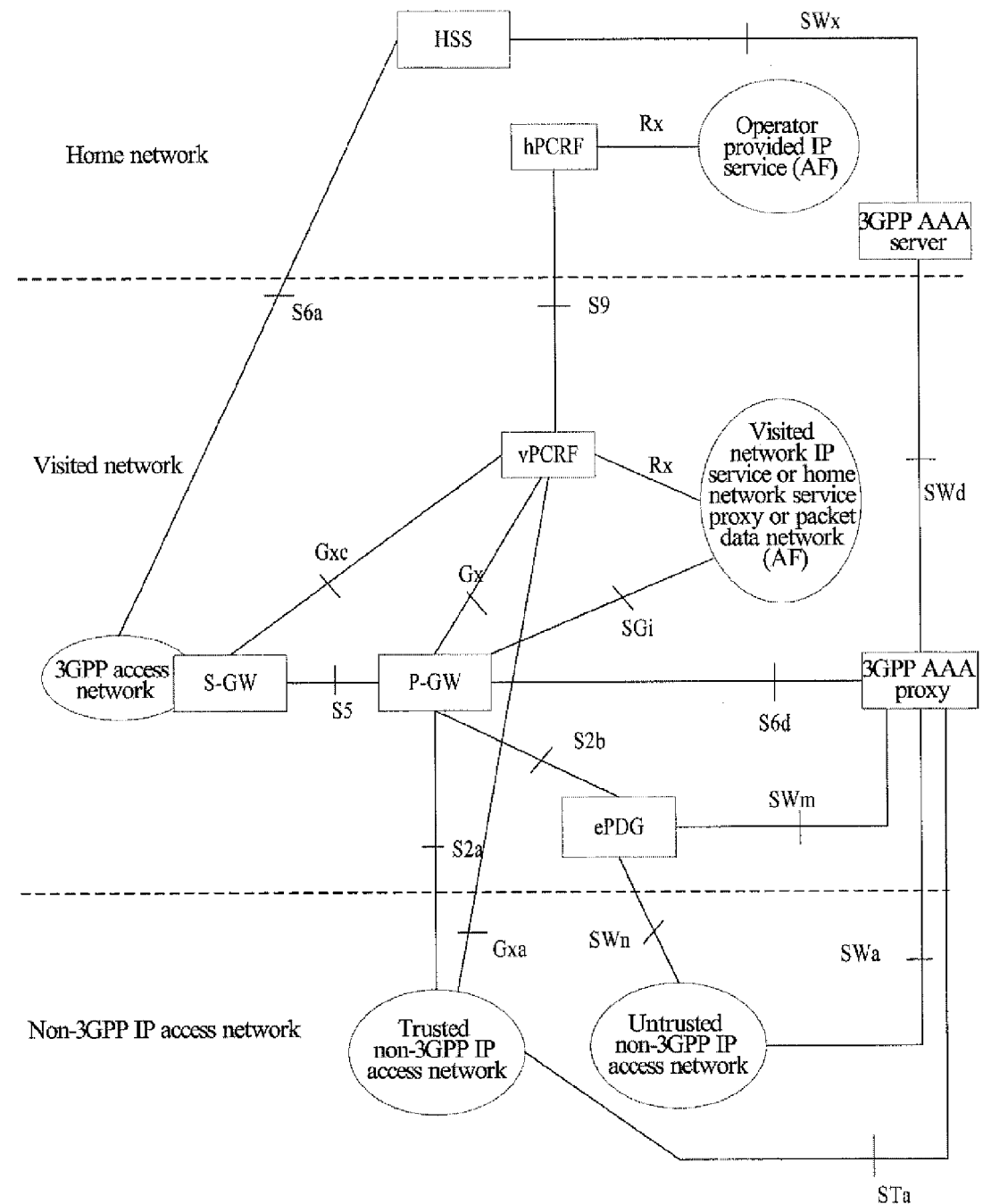
FIG. 5 is a roaming structure diagram of the EPS for local breakout in the existing technology.
Figure 6:
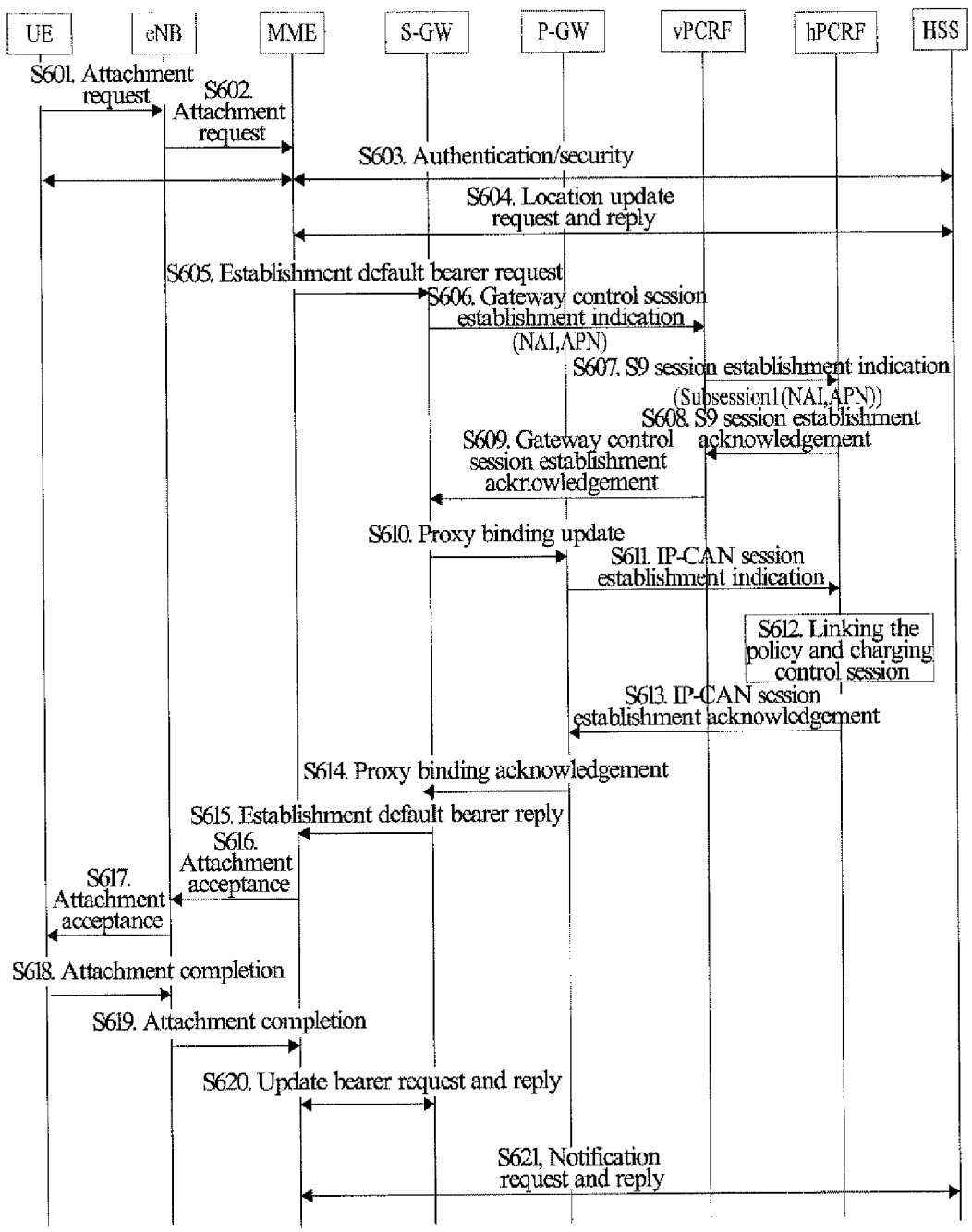
FIG. 6 is a flow chart of a process in which a UE performs initial attachment via the E-UTRAN in a roaming scenario of home routed according to Example 1 of the present invention.

FIG. 6 is a flow chart of a process in which a UE performs initial attachment via the E-UTRAN in a roaming scenario of home routed according to Example 1 of the present invention; wherein the PMIPv6 protocol is used between an S-GW and P-GW. The process shown in FIG. 6 mainly comprises the following steps.

Step S601, the UE sends an attachment request message to an eNodeB to request access to to the EPS.

Step S602, the eNodeB sends the attachment request message to an MME.

Step S603, a network authenticates the UE and starts NAS security encryption protection.

Step S604, the MME interacts with the HSS after the authentication of the UE is passed, and performs a location update process.

Step S605, the MME selects the P-GW for the UE based on a default APN subscribed by a user, and selects an S-GW, and sends an establishment default bearer request message to the selected S-GW.

Step S606, a BBERF located in the S-GW sends a gateway control session establishment indication message containing a user identifier NM, a PDN identifier APN and a bearer attribute (including IP-CAN type, RAT type, and BBERF address) of the current access network to a vPCRF; the gateway control session (Gxx session) that this message requests to establish is denoted as Gxx session 1.

Step S607, the vPCRF determines that the corresponding user is a roaming user based on the NM and that the S9 session has not been established for this user. Therefore, the vPCRF sends an S9 session establishment indication message to an hPCRF to request establishment of Subsession1 of the S9 session, the vPCRF maintains the linking relationship between Gxx session1 and Subsession1, and sends Subsession1 containing the NM, APN and the bearer attribute of the current access network to the hPCRF.

Step S608, the hPCRF obtains subscription information of the user based on the NM and APN, so as to make policies based on the subscription information of the user, network policies and the bearer attribute of the current access network, and at this point, the policies made by the hPCRF are some default policies for the user to access to the APN, including PCC rules, QoS rules, and an event trigger.

The hPCRF returns an S9 session establishment acknowledgement message to the vPCRF, and sends Subsession1 containing the QoS rules and event trigger to the vPCRF.

Step S609, the vPCRF returns a gateway control session establishment acknowledgement message of Gxx session1 to the BBERF, and sends the QoS rules and the event trigger in Subsession1 to the BBERF; and the BBERF installs and performs the QoS rules and the event trigger.

Step S610, the S-GW sends a proxy binding update message containing the user identifier NAI, the PDN identifier APN and the bearer attribute (including IP-CAN type, or IP-CAN type and RAT type) of the access network to the P-GW selected by the MME in step S605.

Step S611, the P-GW allocates an IP address, which is denoted as IP Address1, to a PDN connection that is requested to be established by the UE for access; in a roaming scenario of homing routed, the P-GW is located in a home network, and the PCEF located in the P-GW sends an IP-CAN session establishment indication message containing the user identifier NAI, PDN identifier APN, W Address1, and the bearer attribute of the access network to the hPCRF; the Gx session that this message requests to establish is denoted as Gx session1.

Step S612, the hPCRF links Gx session 1 to Subsession1 in the S9 session based on the NAI and APN.

Step S613, the hPCRF returns an IP-CAN session establishment acknowledgement message of Gx session1 to the PCEF, and sends the PCC rules and the event trigger made in step S608 to the PCEF; the PCEF installs and performs the PCC rules and the event trigger.

The hPCRF might modify the PCC rules and QoS rules based on the bearer attribute of the access network reported in step S611, and at this point, the hPCRF will send the modified PCC rules and QoS rules to the PCEF and BBERF respectively for updating.

Step S614, the P-GW returns a proxy binding acknowledgement message containing W Address1 to the S-GW.

Step S615, the S-GW returns an establishment default bearer reply message containing IP Address1 to the MME.

Step S616, the MME returns an attachment acceptance message containing IP Address1 to the eNodeB.

Step S617, the eNodeB returns the attachment acceptance message containing IP Address1 to the UE.

Step S618, the UE sends an attachment completion message to the eNodeB.

Step S619, the eNodeB sends the attachment completion message to the MME.

Step S620, the MME and the S-GW perform an interaction process of updating the bearer.

Step S621, the MME knows that the UE can access through the non-3GPP system based on the subscription information of the user, and thus sends the address of the P-GW selected when the UE establishes the PDN connection to the HSS, which stores the address of the P-GW and then returns a reply message.

Figure 7A:
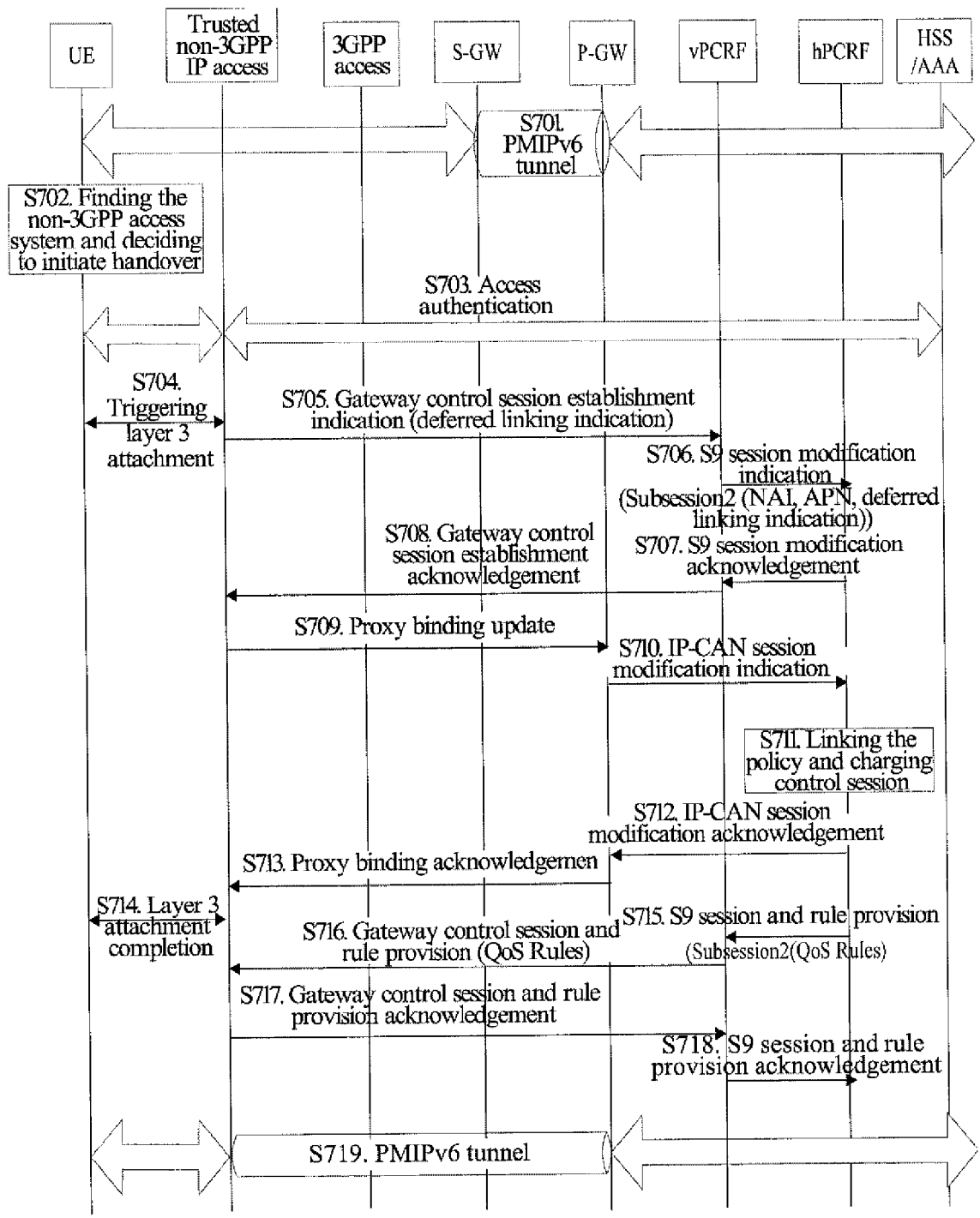
FIG. 7a is a flow chart of handover of a UE from the E-UTRAN access to the trusted non-3GPP access after the UE with network mobility capability accesses to the EPS using the process shown in FIG. 6 according to Example 1 of the present invention.

FIG. 7a is a flow chart of handover of a UE from the E-UTRAN access to the trusted non-3GPP access after the UE with network mobility capability accesses to the EPS using the process shown in FIG. 6 according to Example 1 of the present invention, wherein in the case of the non-3GPP access, the PMIPv6 protocol is used between a trusted non-3GPP access gateway and a P-GW. In this process, the UE has the network mobility capability (i.e., IP address keeping capability). The process shown in FIG. 7a mainly comprises the following steps.

Step S701, the UE establishes a PDN connection through the 3GPP access, and there is a PMIPv6 tunnel between the S-GW and the P-GW.

Step S702, the UE finds the trusted non-3GPP access system and decides handover of the current session from the 3GPP access system to the trusted non-3GPP access system.

Step S703, the UE, trusted non-3GPP access gateway and HSS/AAA perform an EAP authentication process, in which the HSS/AAA returns the address of the P-GW selected by the UE during the 3GPP access to the trusted non-3GPP access gateway.

Step S704, a layer 3 attachment process specific to the non-3GPP access is triggered upon success of the authentication.

Step S705, since the trusted non-3GPP access gateway is not sure whether the UE has the network mobility capability (i.e., the IP address keeping capability), a BBERF located in the trusted non-3GPP access gateway sends a gateway control session establishment indication message containing a user identifier NAI, PDN identifier APN, new bearer attribute (including IP-CAN type, or IP-CAN type and RAT type) of the current access network and deferred linking indication to a vPCRF; the gateway control session (Gxx session) that this message requests to establish is denoted as Gxx session2.

Step S706, since the gateway control session establishment indication message contains the deferred linking indication, the vPCRF does not link Gxx session2 to Subsession1 established in the process shown in FIG. 6 based on the NAI and APN; the vPCRF decides to newly establish one subsession of the S9 session, thus the vPCRF sends an S9 session modification indication message to a hPCRF to request establishment of a new Subsession2; the vPCRF maintains the linking relationship between Gxx2 and Subsession2, and sends Subsession2 containing the new bearer attribute of the access network, NAI, and APN to the hPCRF; this message further contains the deferred linking indication.

Step S707, since the S9 session modification indication message contains the deferred linking indication, the hPCRF does not link Subsession2 to Gx session1 established in the process shown in FIG. 6; the hPCRF makes QoS rules and an event trigger for the UE through the non-3GPP access based on the subscription information of a user, network policies, and the new hearer attribute of the access network, these rules are the default policies of the user, and do not include the policies for the user to access the dedicated services previously; the hPCRF sends Subsession2 containing the QoS rules and the event trigger to the vPCRF through an S9 session modification acknowledgement message.

Step S708, the vPCRF sends the QoS rules and event trigger to a BBERF in the trusted non-3GPP access gateway through a gateway control session establishment acknowledgement message of Gxx session2; the BBERF installs and performs the QoS rules and the event trigger; the trusted non-3GPP access gateway performs a specific non-3GPP access process for resource reservation.

Step S709, the trusted non-3GPP access gateway sends a proxy binding update message containing the user identifier NM, the PDN identifier APN and the bearer attribute (including IP-CAN type, or IP-CAN type and RAT type) of the current access network to the corresponding P-GW based on the address of the P-GW obtained in step S703.

Step S710, if the P-GW determines that the UE has the network mobility capability (i.e., the IP address keeping capability), then a handover process of the UE is performed.

The P-GW allocates an IP address (IP Address1) used when the UE accesses to the network via the 3GPP system to the UE based on the NAI and APN so as to keep the IP address unchanged and further ensure the service continuity.

The PCEF located in the P-GW sends an IP-CAN session modification indication message containing the new bearer attribute (including IP-CAN type, or IP-CAN type and RAT type) of the access network to the hPCRF. This message may also contain the user identifier ANI and the PDN identifier APN. This message modifies Gx session1 established in the process shown in FIG. 6.

Step S711, the hPCRF determines that the UE can perform the handover process based on the IP-CAN session modification indication message sent by the PCEF, and thus links Gx session1 to Subsession2 based on the NM and APN, while continuing to maintain the linking relationship between Gx session1 and Subsession1.

Step S712, the hPCRF might modify the PCC rules, QoS rules and event trigger of the PDN connection established before the handover of the UE based on the new bearer attribute of the access network; these rules include the policies for the UE to access the dedicated services through the 3GPP access; the hPCRF returns the modified PCC rules and the event trigger to the PCEF through a IP-CAN session modification acknowledgement message of Gx session1 for updating.

Step S713, the P-GW returns a proxy binding acknowledgement message containing IP Address1 to the trusted non-3GPP access gateway.

Step S714, the trusted non-3GPP access gateway returns a layer 3 attachment completion message containing IP Address 1 to the UE.

Step S715, the hPCRF sends an S9 session and rule provision message of Subsession2 containing the QoS rules and event trigger made in step S712 to the vPCRF.

Step S716, the vPCRF sends the QoS rules and the event trigger to the BBERF in the trusted non-3GPP access gateway through a gateway control and QoS rule provision message of Gxx session2.

Step S717, the BBERF installs the QoS rules and the event trigger, and then returns a gateway control and QoS rule provision acknowledgement message; the trusted non-3GPP access gateway performs a specific non-3GPP access process for resource reservation.

Step S718, the vPCRF returns an S9 session and rule provision acknowledgement message to the hPCRF.

Step S719, the UE performs handover of the PDN connection from the 3GPP access to the trusted non-3GPP access, and there is a PMIPv6 tunnel (this PMIPv6 tunnel is established in steps S709 and S713) between the trusted non-3GPP access gateway and the P-GW. All the services accessed by the UE through the 3GPP access can be continued to be accessed.

Figure 7B:
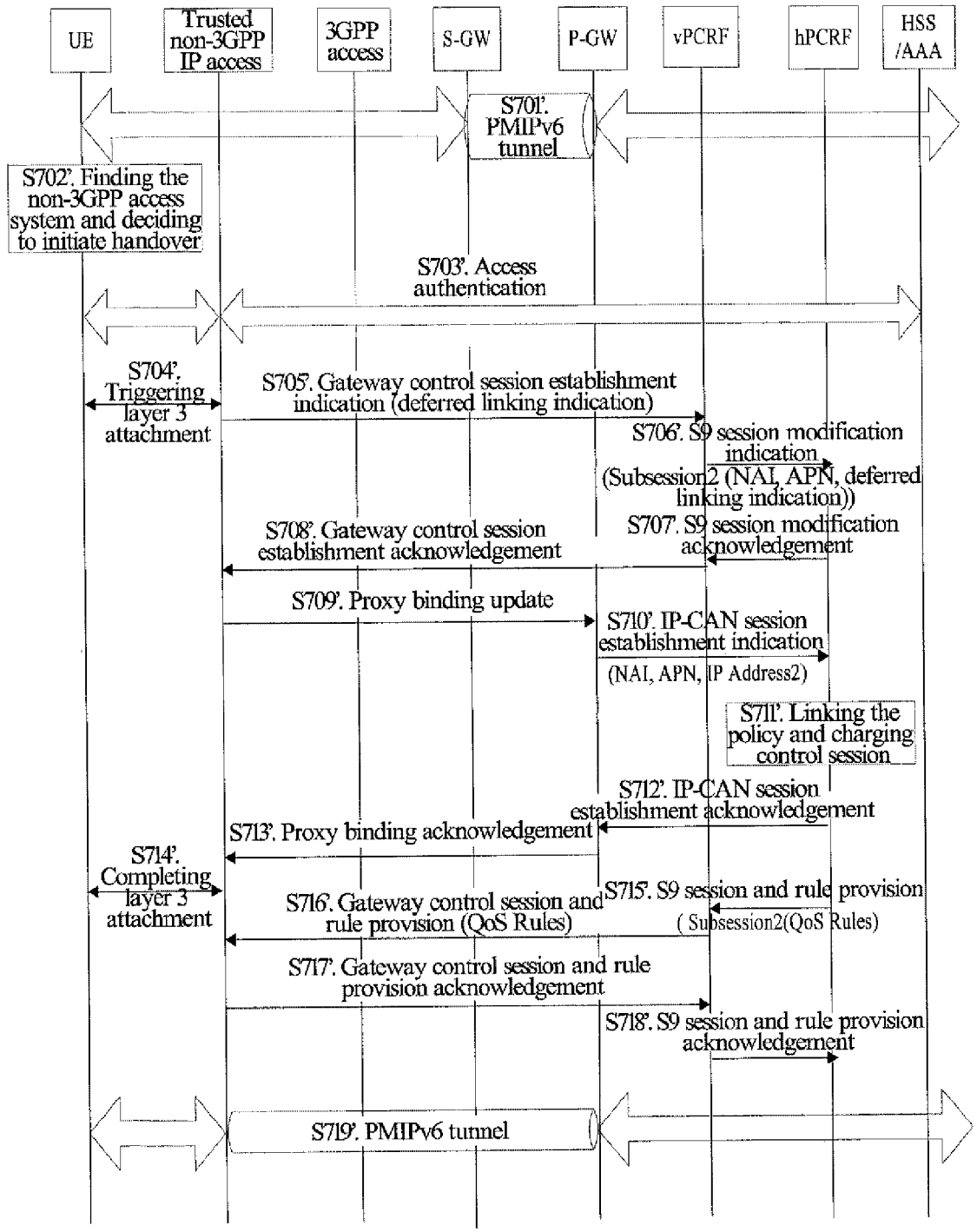
FIG. 7b is a flow chart of handover of a UE from the E-UTRAN access to the trusted non-3GPP access after the UE without network mobility capability accesses to the EPS using the process shown in FIG. 6 according to Example 1 of the present invention.

In the above process, if the P-GW determines that the UE does not have the network mobility capability, then the P-GW will establish a new PDN connection (i.e., IP-CAN session) for the UE. The specific steps performed are as shown in FIG. 7b.

Steps S701'.about.S709' are the same as the steps S701.about.S709 respectively.

Step S710', if the P-GW determines that the UE does not have the network mobility capability (i.e., does not have the IP address keeping capability), then the P-GW decides to establish a new PDN connection.

The P-GW allocates a new IP address (denoted as IP Address2) to the UE.

The PCEF located in the P-GW sends an IP-CAN session establishment indication message containing the user identifier NM, the PDN identifier APN, IP Address2, and the new bearer attribute (including IP-CAN type, or JP-CAN type and RAT type) of the access network to the hPCRF; this message requests to establish a new Gx session, which is denoted as Gx session2.

Step S711', the hPCRF determines that the UE cannot perform the handover process based on the IP-CAN session establishment indication message sent by the PCEF but newly establish a PDN connection in the trusted non-3GPP access gateway, and thus links Subsession2 to Gx session2 based on the NM and APN.

Step S712', the hPCRF makes the default policies (including PCC rules, QoS rules and an event trigger) for the newly established PDN connection (i.e., the IP-CAN session) based on the new bearer attribute of the access network, network policies, and subscription information of the user, and returns the PCC rules and the event trigger to the PCEF through an IP-CAN session establishment acknowledgement message of Gx session2, and the PCEF installs and performs the PCC rules and event trigger.

Step S713', the P-GW returns a proxy binding acknowledgement message containing IP Address2 to the trusted non-3GPP access gateway.

Step S714', the trusted non-3GPP access gateway returns a layer 3 attachment completion message containing IP Address2 to the UE.

Step S715', if the QoS rules and the event trigger made in step S712' are different from those made in step S707', the hPCRF sends an S9 session and rule provision message of Subsession2 containing the QoS rules and event trigger made in step S712' to the vPCRF.

Step S716', the vPCRF sends the QoS rules and the event trigger to the BBERF in the trusted non-3GPP access gateway through the gateway control and QoS rule provision message of Gxx session2.

Step S717', the BBERF installs the QoS rules and the event trigger, and then returns a gateway control and QoS rule provision acknowledgement message to the vPCRF; the trusted non-3GPP access gateway performs the specific non-3GPP access process for resource reservation.

Step S718', the vPCRF returns the S9 session and rule provision acknowledgement message to the hPCRF.

Step S719', the UE newly establishes one PDN connection (i.e., the IP-CAN session) through the trusted non-3GPP access network, and there is a PMIPv6 tunnel (this PMIPv6 tunnel is established in steps S709' and S713') between the trusted non-3GPP access gateway and the P-GW; the services accessed by the UE through the 3GPP access cannot be continued to be accessed, and the UE is required to reinitiate a service access request.

In this example, the system for a Bearer Binding and Event Report Function (BBERF) relocation mainly comprises a visited Policy and Charging Rule Function (PCRF), a home PCRF and a Policy and Charging Execution Function (PCEF), wherein after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation, the visited PCRF is configured to establish the second subsession of the S9 session with the home PCRF, establish the second gateway control session with the destination BBERF, and link the second gateway control session to the second subsession;

the PCEF is configured to send an IP-CAN session modification indication message or an IP-CAN session establishment indication message to the home PCRF; and the home PCRF is configured to link the first Gx session that the IP-CAN session modification indication message requests to modify to the second subsession based on the session identifier information contained in the IP-CAN session modification indication message; link the second Gx session that the IP-CAN session establishment indication message requests to establish to the second subsession based on the session identifier information contained in the IP-CAN session establishment indication message.

This example is also suitable for handover of the UE from a trusted non-3GPP access network to another trusted non-3GPP access network. When the UE accesses through two non-3GPP access networks, the PMIPv6 protocol is used between the trusted non-3GPP access gateway and the P-GW.

Example 2

Figure 8:
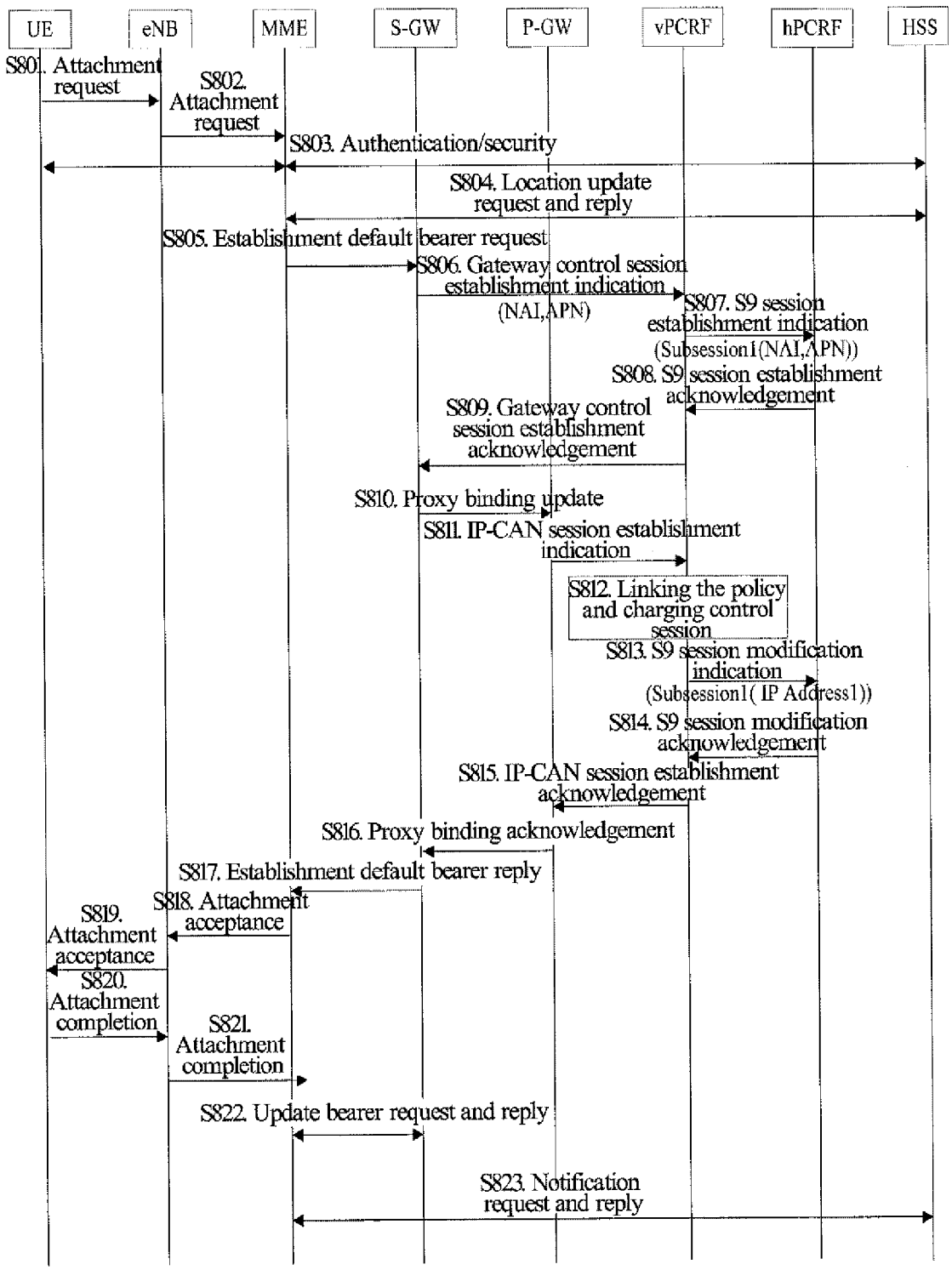
FIG. 8 is a flow chart of a process in which a UE performs initial attachment via the E-UTRAN in a roaming scenario of home breakout according to Example 2 of the present invention.

FIG. 8 is a flow chart of a process in which a UE performs initial attachment via the E-UTRAN in a roaming scenario of home breakout according to Example 2 of the present invention; wherein the PMIPv6 protocol is used between the S-GW and P-GW. The process shown in FIG. 8 mainly comprises following steps.

Step S801, the UE sends an attachment request message to an eNodeB to request access to the EPS.

Step S802, the eNodeB sends an attachment request message to an MME.

Step S803, the network authenticates the UE and starts NAS security encryption protection.

Step S804, the MME interacts with a HSS after the authentication is passed, and performs a location update process.

Step S805, the MME selects a P-GW for the UE based on a default APN subscribed by a user, and selects an S-GW, and sends an establishment default bearer request message to the selected S-GW.

Step S806, a BBERF located in the S-GW sends a gateway control session establishment indication message containing a user identifier NAI, a PDN identifier APN and a bearer attribute (including IP-CAN type, RAT type, and BBERF address) of the current access network to a vPCRF; the gateway control session (Gxx session) that this message requests to establish is denoted as Gxx session 1.

Step S807, the vPCRF determines that the corresponding user is a roaming user based on the NAI and that the S9 session has not been established for this user. Therefore, the vPCRF sends an S9 session establishment indication message to an hPCRF to request establishment of Subsession1 of the S9 session, the vPCRF maintains the linking relationship between Gxx session1 and Subsession1, and sends Subsession1 containing the NAI, APN and the bearer attribute of the current access network to the hPCRF.

Step S808, the hPCRF obtains subscription information of the user based on the NAI and APN, so as to make policies based on the subscription information of the user, network policies and the bearer attribute of the current access network, and at this point, the policies made by the hPCRF are some default policies for the user to access to the APN, including PCC rules, QoS rules, and an event trigger.

The hPCRF returns an S9 session establishment acknowledgement message to the vPCRF, and sends Subsession1 containing the QoS rules and event trigger to the vPCRF.

Step S809, the vPCRF returns a gateway control session establishment acknowledgement message of Gxx session1 to the BBERF, and sends the QoS rules and the event trigger in Subsession1 to the BBERF; and the BBERF installs and performs the QoS rules and the event trigger.

Step S810, the S-GW sends a proxy binding update message containing the user identifier NAI, the PDN identifier APN and the bearer attribute (including IP-CAN type, or IP-CAN type and RAT type) of the access network to the P-GW selected by the MME in step S805.

Step S811, the P-GW allocates an IP address, which is denoted as IP Address1, to a PDN connection that is requested to be established by the UE for access; the PCEF located in the P-GW sends an IP-CAN session establishment indication message containing the user identifier NAI, PDN identifier APN, IP Address1, and the bearer attribute (including IP-CAN type, or IP-CAN type and RAT type) of the access network to the hPCRF; the Gx session that this message requests to establish is denoted as Gx session 1.

Step S812, the hPCRF links Gx session 1 to Gxx session 1 as well as Subsession1 in the S9 session based on the NAI and APN.

Step S813, the vPCRF sends an S9 session modification indication message to the hPCRF, and sends Subsession1 containing IP Address1 into to the hPCRF.

Step S814, the hPCRF returns an S9 session modification acknowledgement message to the vPCRF, and sends Subsession1 containing the PCC rules and the event trigger made in step S808 to the vPCRF.

The hPCRF might modify the PCC rules, QoS rules and event trigger, and at this point, the hPCRF will send the modified PCC rules and QoS rules respectively to the PCRF and BBERF for updating.

Step S815, the vPCRF sends an IP-CAN session establishment acknowledgement message of Gx session1 to the PCEF, and sends the PCC rules and the event trigger to the PCEF; the PCEF installs and performs the PCC rules and the event trigger.

Step S816, the P-GW returns a proxy binding acknowledgement message containing IP Address1 to the S-GW.

Step S817, the S-GW returns an establishment default bearer reply message containing IP Address1 to the MME.

Step S818, the MME returns an attachment acceptance message containing IP Address1 to the eNodeB.

Step S819, the eNodeB returns the attachment acceptance message containing IP Address1 to the UE.

Step S820, the UE sends an attachment completion message to the eNodeB.

Step S821, the eNodeB sends the attachment completion message to the MME.

Step S822, the MME and the S-GW perform an interaction process of updating the bearer.

Step S823, the MME knows that the UE can can access through the non-3GPP system based on the subscription information of the user, and thus sends the address of the P-GW selected when the UE establishes the PDN connection to the HSS, which stores the address of the P-GW and then returns a reply message.

Figure 9A:
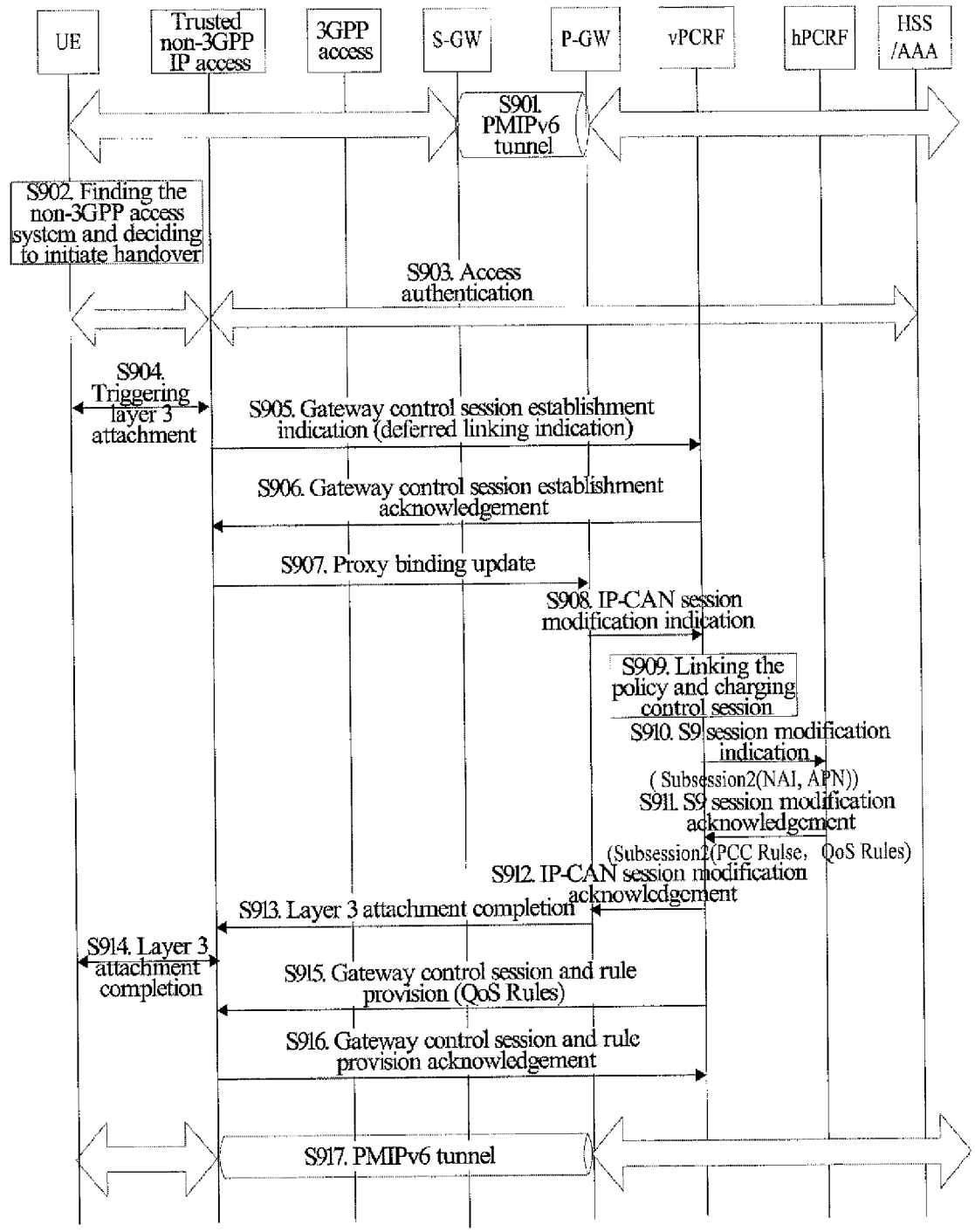
FIG. 9a is a flow chart of handover of a UE from the E-UTRAN access to the trusted non-3GPP access after the UE with network mobility capability accesses to the EPS using the process shown in FIG. 8 according to Example 2 of the present invention.

FIG. 9a is a flow chart of handover of a UE from the E-UTRAN access to the trusted non-3GPP access after the UE with network mobility capability accesses to the EPS using the process shown in FIG. 8 according to Example 2 of the present invention, wherein in the case of the non-3GPP access, the PMIPv6 protocol is used between a trusted non-3GPP access gateway and a P-GW, and in this process, the UE has the network mobility capability (i.e., IP address keeping capability). The process shown in FIG. 9a mainly comprises following steps.

Step S901, the UE establishes a PDN connection through the 3GPP access, and there is a PMIPv6 tunnel between the S-GW and the P-GW.

Step S902, the UE finds the trusted non-3GPP access system and decides handover of the current session from the 3GPP access system to the trusted non-3GPP access system.

Step S903, the UE, trusted non-3GPP access gateway and HSS/AAA perform an EAP authentication process, in which the HSS/AAA returns the address of the P-GW selected by the UE during the 3GPP access to the trusted non-3GPP access gateway.

Step S904, a layer 3 attachment process specific to the non-3GPP access is triggered upon success of the authentication.

Step S905, since the trusted non-3GPP access gateway is not sure whether the UE has the network mobility capability (i.e., the IP address keeping capability), a BBERF located in the trusted non-3GPP access gateway sends a gateway control session establishment indication message containing a user identifier NAI, PDN identifier APN, new bearer attribute (including IP-CAN type, or IP-CAN type and RAT type) of the current access network and deferred linking indication to a vPCRF; the gateway control session (Gxx session) that this message requests to establish is denoted as Gxx session2.

Step S906, since the gateway control session establishment indication message contains the deferred linking indication, the vPCRF does not link Gxx session2 to any subsession of an S9 session; since the roaming way of the UE is local breakout, the vPCRF searches the default QoS rules and the event trigger sent by the hPCRF in FIG. 8 based on the NM and APN, and correspondingly modifies the default QoS rules and the event trigger sent by the hPCRF in FIG. 8 based on the new bearer attribute of the access network, and sends a gateway control session establishment acknowledgement message of Gxx session2 containing the modified QoS rules and event trigger to the BBERF in the trusted non-3GPP access gateway; the BBERF installs and performs the QoS rules and the event trigger; the trusted non-3GPP access gateway performs the specific non-3GPP access process for resource reservation.

Step S907, the trusted non-3GPP access gateway sends a proxy binding update message containing the user identifier NM, the PDN identifier APN and the bearer attribute (including IP-CAN type, or IP-CAN type and RAT type) of the current access network to the corresponding P-GW based on the P-GW address obtained in step S903.

Step S908, if the P-GW determines that the UE has the network mobility capability (i.e., the IP address keeping capability), then the P-GW performs a handover process of the UE.

The P-GW allocates an IP address (IP Address1) used when the UE accesses to the network via the 3GPP system to the UE based on the NM and APN so as to keep the IP address unchanged and further ensure the service continuity The PCEF located in the P-GW sends an IP-CAN session modification indication message containing the new bearer attribute (including IP-CAN type, or IP-CAN type and RAT type) of the access network to the vPCRF. This message modifies Gx session1 established in the process shown in FIG. 8.

Step S909, the vPCRF determines that the UE can perform the handover process based on the received IP-CAN session modification indication message, and thus links Gx session2 established in step S905 to Gx session1 based on the NAI and APN.

Step S910, the vPCRF sends an S9 session modification indication message to the hPCRF to request establishment of a new subsession Subsession2, and sends Subsession2 containing the NM, the APN and the new bearer attribute of the access network to the hPCRF; and this message further contains the execution indication to notify the hPCRF to performing the handover process of the UE.

Step S911, the hPCRF determines that the UE can perform the handover process based on the execution indication, and thus modifies the PCC rules, the QoS rules and the event trigger of the PDN connection that is established before the handover of the UE based on the new bearer attribute of the access network, these rules include the default policies for the user to access the dedicated services through the 3GPP access; the hPCRF sends Subsession2 containing the modified PCC rules, QoS rules and the event trigger to the vPCRF through a S9 session modification acknowledgement message.

Step S912, the vPCRF sends the PCC rules and the event trigger to the PCEF through an IP-CAN session modification acknowledgement message of Gx session1, and the PCEF updates the PCC rules and the event trigger.

Step S913, the P-GW returns a proxy binding acknowledgement message containing IP Address1 to the trusted non-3GPP access gateway.

Step S914, the trusted non-3GPP access gateway returns a layer 3 attachment completion message containing IP Address1 to the UE.

Step S915, the vPCRF sends the QoS rules and the event trigger to the BBERF in the trusted non-3GPP access gateway through a gateway control and QoS rule provision message of Gxx session2.

Step S916, the BBERF installs and performs the QoS rules and the event trigger, and then returns a gateway control and QoS rule provision acknowledgement message to the vPCRF; the trusted non-3GPP access gateway performs the specific non-3GPP access process for resource reservation.

Step S917, the UE performs handover of the PDN connection from the 3GPP access to the trusted non-3GPP access, and there is a PMIPv6 tunnel (this PMIPv6 tunnel is established in steps S907 and S913) between the trusted non-3GPP access gateway and the P-GW. All the services accessed by the UE through the 3GPP access can be continued to be accessed.

In other examples of the present invention, the hPCRF only makes/modifies the PCC rules not makes/modifies the QoS rules; in this case, the vPCRF makes the corresponding QoS rules based on the PCC rules sent by the hPCRF, and sends the QoS rules to the corresponding BBERF. For example, the hPCRF makes the PCC rules for the PDN connection established by the UE through the trusted non-3GPP access and sends the PCC rules to the vPCRF, and the vPCRF makes the QoS rules based on the PCC rules and sends the QoS rules to the BBERF in the trusted non-3GPP access gateway.

Figure 9B:
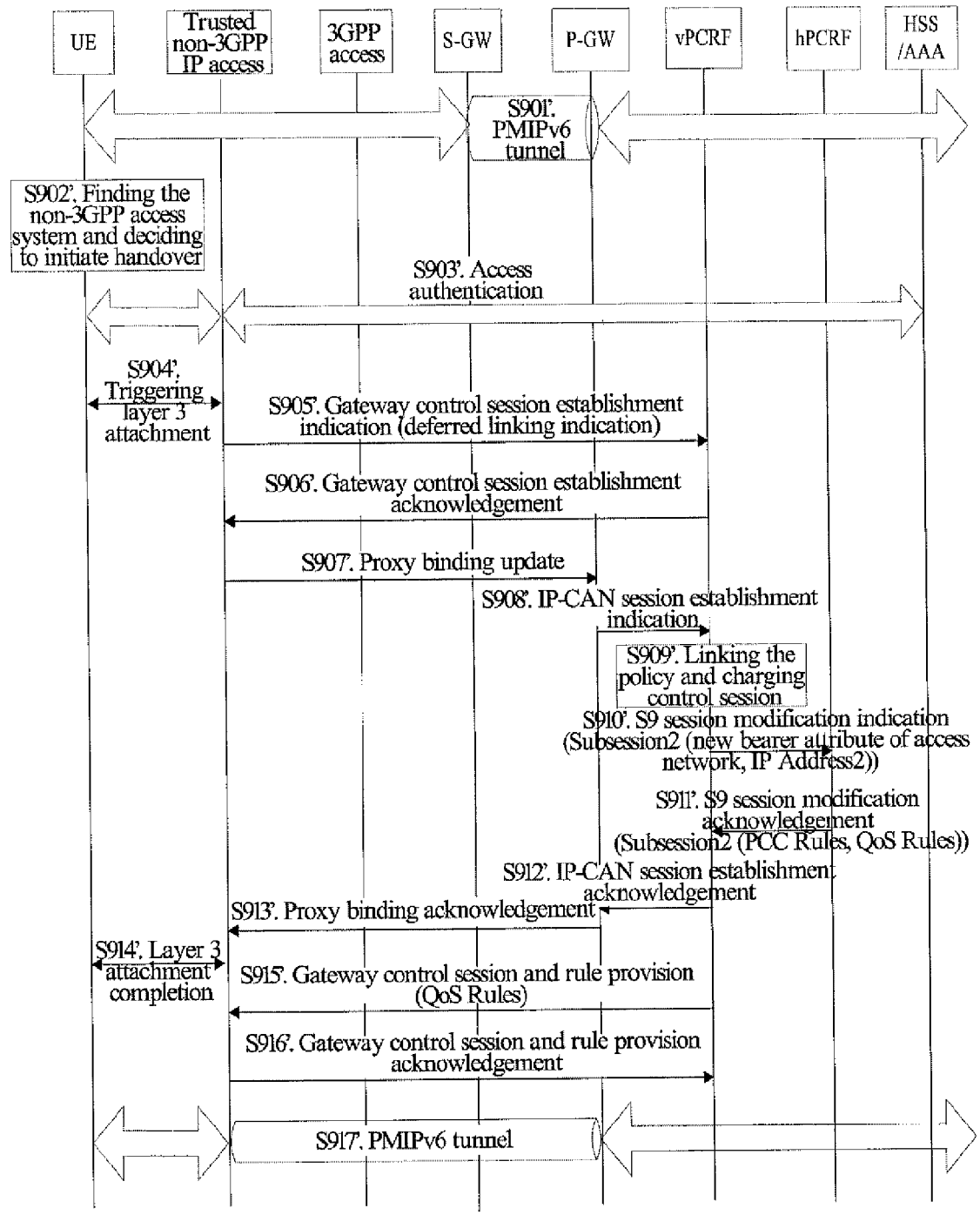
FIG. 9b is a flow chart of handover of a UE from the E-UTRAN access to the trusted non-3GPP access after the UE without network mobility capability accesses to the EPS using the process shown in FIG. 8 according to Example 2 of the present invention.

In the above process, if the P-GW determines that the UE does not have the network mobility capability, then the P-GW will establish a new PDN connection (i.e., the IP-CAN session) for the UE. The specific steps performed are as shown in FIG. 9b.

Steps S901'.about.S907' are the same with the steps S901.about.S907 respectively.

Step S908', if the P-GW determines that the UE does not have the network mobility capability (i.e., does not have the IP address keeping capability), then the P-GW decides to establish a new PDN connection.

The P-GW allocates a new IP address (denoted as IP Address2) to the UE.

The PCEF located in the P-GW sends an IP-CAN session establishment indication message containing the user identifier NM, the PDN identifier APN, IP Address2, and the new bearer attribute (including IP-CAN type, or IP-CAN type and RAT type) of the access network to the hPCRF; this message requests to establish a new Gx session, which is denoted as Gx session2.

Step S909', the hPCRF determines that the UE cannot perform the handover process based on the IP-CAN session establishment indication message sent by the PCEF but newly establish a PDN connection in the trusted non-3GPP access gateway, and thus links Subsession2 to Gx session2 based on the NAI and APN.

Step S910', the vPCRF sends an S9 session modification indication message to the hPCRF to request establishment of a new Subsession2, and sends Subsession2 containing the NAI, APN, the new bearer attribute of the access network to the hPCRF; and this message further contains the execution indication to notify the hPCRF to perform the process of newly establishing the PDN connection (i.e., the IP-CAN session).

Step S911', the hPCRF determines that the UE initiates to establish a new PDN connection (i.e., the IP-CAN session) based on the execution indication, and thus the hPCRF makes the PCC rules, the QoS rules and the event trigger for the newly established PDN connection based on the new bearer attribute of the access network, network policies and subscription information of the user, and these rules are all the default rules and do not contain the policy for the user to access the dedicated services through the 3GPP access; the hPCRF sends Subsession2 containing the above PCC rules, QoS rules and the event trigger to the vPCRF through an S9 session modification acknowledgement message.

Step S912', the vPCRF sends the PCC rules and the event trigger to the PCEF through an IP-CAN session modification acknowledgement message of Gx session2, and the PCEF installs and performs the PCC rules and the event trigger.

Step S913', the P-GW returns a proxy binding acknowledgement message containing IP Address2 to the trusted non-3GPP access gateway.

Step S914', the trusted non-3GPP access gateway returns a layer 3 attachment completion message containing IP Address2 to the UE.

Step S915', the vPCRF sends the QoS rules and the event trigger to the BBERF in the trusted non-3GPP access gateway through a gateway control and QoS rule provision message of Gxx session2.

Step S916', the BBERF installs and performs the QoS rules and the event trigger, and then returns a gateway control and QoS rule provision acknowledgement message to the vPCRF; the trusted non-3GPP access gateway performs the specific non-3GPP access process for resource reservation.

Step S917', the LIE newly establishes one PDN connection (i.e., IP-CAN session) through the trusted non-3GPP access network, and there is a PMIPv6 tunnel (this PMIPv6 tunnel is established in steps S907' and S913') between the trusted non-3GPP access gateway and the P-GW; the services accessed by the UE through the 3GPP access cannot be continued to be accessed, and the UE is required to reinitiate a service access request.

This example is also suitable for handover of the UE from a trusted non-3GPP access network to another trusted non-3GPP access network. When the UE accesses through two non-3GPP access networks, the PMIPv6 protocol is used between the trusted non-3GPP access gateway and the P-GW.

In other examples of the present invention, the hPCRF only makes the PCC rules not makes the QoS rules. In this case, the vPCRF makes the corresponding QoS rules based on the PCC rules sent by the hPCRF, and sends the QoS rules to the corresponding BBERF. For example, the hPCRF makes the FCC rules for the PDN connection established by the UE through the trusted non-3GPP access and sends the PCC rules to the vPCRF, and the vPCRF makes the QoS rules based on the PCC rules and sends the QoS rules to the BBERF in the trusted non-3GPP access gateway.

In this example, the system for a Bearer Binding and Event Report Function (BBERF) relocation comprising a visited Policy and Charging Rule Function (PCRF), a home PCRF and a Policy and Charging Execution Function (PCEF), wherein after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation, the PCEF is configured to send an IP-CAN session modification indication message or an IP-CAN session establishment indication message to the visited PCRF;

the visited PCRF is configured to establish the second gateway control session with the destination BBERF, and link the first Gx session that the IP-CAN session modification indication message requests to modify to the second gateway control session based on session identifier information in the IP-CAN session modification indication message; and establish the second subsession of the S9 session with the home PCRF, and obtain policies that is modified by the home PCRF for the user; link the second Gx session that the IP-CAN session establishment indication message requests to establish to the second gateway control session based on the session identifier information contained in the IP-CAN session establishment indication message; and establish the second subsession of the S9 session with the home PCRF, and obtain policies that is newly made by the home PCRF for the user; and the home PCRF is configured to newly make policies for the user, and establish the second subsession of the S9 session with the visited PCRF.

Obviously, it is should be understood by those skilled in the art that each module or each step described above in the present invention can be implemented by universal computing devices, which may be integrated into a single computing device or distributed in a network composed of multiple computing devices. Optionally, the modules or steps can be implemented by executable program codes of the computing devices such they can be stored in a storage device for execution by the computing device, or they can be implemented by making them into various integrated circuit modules or by making multiple modules or steps contained in them into a single integrated circuit module. Therefore, the present invention is not limited to any specific combinations of the hardware and software.

Although the embodiments are disclosed in the present invention, the described contents are only embodiments used for the purpose of understand the present invention and not intended to limit the present invention. Any modification and variation to the present invention may be made by those skilled in the art without departing from the spirit and the scope of the present invention. However, the protection scope of the present invention should be subject to the scope defined by the appended claims.

What is claimed is:

1. A method for a Bearer Binding and Event Report Function (BBERF) relocation comprising:

after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation:

establishing a second subsession of the S9 session between a visited Policy and Charging Rule Function (PCRF) and a home PCRF, and linking a second gateway control session established between a destination BBERF and the visited PCRF to the second subsession;

if an IP-CAN session modification indication message sent by a Policy and Charging Execution Function (PCEF) is received, then the home PCRF linking the first Gx session that the IP-CAN session modification indication message requests to modify to the second subsession based on session identifier information contained in the IP-CAN session modification indication message; and if an IP-CAN session establishment indication message sent by the PCEF is received, then the home PCRF linking a second Gx session that the IP-CAN session establishment indication message requests to establish to the second subsession based on session identifier information contained in the IP-CAN session establishment indication message.

2. The method according to claim 1, wherein:

after receiving a gateway control session establishment indication message sent by the destination BBERF, the visited PCRF establishes the second subsession with thehome PCRF based on a deferred linking indication and session identifier information contained in the gateway control session establishment indication message, and links the second gateway control session that the gateway control session establishment indication message requests to establish to the second subsession.

3. The method according to claim 2, wherein the visited PCRF establishes the second subsession by sending an 89 session modification indication message containing the deferred linking indication and session identifier information to the home PCRF.

4. The method according to claim 3, wherein:

after receiving the S9 session modification indication message, the home PCRF sends an S9 session modification acknowledgement message containing a default Quality of Service (QoS) policy made for a user to the visited PCRF based on the deferred linking indication and session identifier information; and after receiving the S9 session modification acknowledgement message, the visited PCRF sends a gateway control session establishment acknowledgement message containing the default QoS policy to the destination BBERF.

5. The method according to claim 2, wherein the session identifier information contains a user identifier and a packet data network identifier.

6. The method according to claim 1, wherein:
after linking the first Gx session to the second subsession, the home PCRF sends a Policy and Charging Control (PCC) policy made for the user to the PCEF through the first Ox session and sends the QoS poiicy made for the user to the visited PCRF through the second subsession, and the visited PCRF sends the QoS policy to the destination BBERF through the second gateway control session; or
after linking the second Ox session to the second subsession, the home PCRF sends the PCC policy made for the user to the PCEF through the second Ox session and sends the QoS policy made for the user to the visited PCRF through the second subsession, and the visited PCRF sends the QoS policy to the destination BBERF through the second gateway control session.

7. The method according to claim 6, wherein the session identifier information contains a user identifier and a packet data network identifier.

8. The method according to claim 1, wherein the session identifier information contains a user identifier and a packet data network identifier.

9. A method for a Bearer Binding and Event Report Function (BBERF) relocation comprising:
after a first IP Connectivity Access Network (IP-CAN) session is established for a User Equipment (UE) in an Evolved Packet System (EPS) and a first gateway control session first Gx session, an S9 session and a first subsession of the S9 session that perform policy control on the first IP-CAN session are established, in a process of the BBERF relocation:
establishing a second gateway control session between a destination BBERF and a visited Policy and Charging Rule Function (PCRF);
if an IP-CAN session modification indication message sent by a Policy and Charging Execution Function (PCEF) is received, then the visited PCRF linking the first Gx session that the IP-CAN session modification indication message requests to modify to the second gateway control session based on session identifier information contained in the CAN session modification indication message, establishing a second subsession of the S9 session with the home PCRF; and
if an IP-CAN session establishment indication message sent by the PCEF is received, then the visited PCRF linking a second Gx session that the IP-CAN session establishment indication message requests to establish to the second gateway control session based on session identifier information contained in the IP-CAN session establishment indication message, establishing the second subsession of the S9 session with the home PCRF.

10. The method according to claim 9, wherein:
the policy modified or newly made by the home PORE contains Policy and charging Control (PCC) rules; and after obtaining the PCC rules modified or newly made by the home PCRF through the second subsession, the visited PCRF sends the PCC rules to the PCEF through the first Gx session, makes corresponding Quality of Service (QoS) rules based on the PCC rules, and sends the QoS rules to the destination BBERF through the second gateway control session.

11. The method according to claim 10, wherein the session identifier information contains a user identifier and a packet data network identifier.

12. The method according to claim 9, wherein
after receiving the IP-CAN session modification indication message, the visited PCRF establishes the second subsession by sending an S9 session modification indication message containing an execution indication to the home PORE, the execution indication being used for indicating the home PORE to modify a policy for the user; after receiving the S9 session modification indication message, the home PORE sends an S9 session modification acknowledgement message containing the policy modified for the user to the visited PCRF based on the execution indication; or after receiving the IP-CAN session establishment indication message, the visited PCRF establishes the second subsession by sending an S9 session modification indication message containing the execution indication to the home PCRF, the execution indication being used for indicating the home PCRF to make a policy for the user; after receiving the S9 session modification indication message, the home PCRF sends an S9 session modification acknowledgement message containing the policy made for the user to the visited PCRF based on the execution indication.

13. The method according to claim 12, wherein the session identifier information contains a user identifier and a packet data network identifier.

14. The method according to claim 9, wherein:
the destination BBERF establishes the second gateway control session by sending a gateway control session establishment indication message containing a deferred linking indication, a bearer attribute of an access network, and session identifier information to the visited PCRF; and after receiving the gateway control session establishment indication message, the visited PCRF searches default Quality of Service (QoS) rules corresponding to the session identifier information based on the deferred inking indication, and modifies the default QoS rules based on the bearer attribute of the access network to send to the destination BBERF through a gateway control sessiOn establishment acknowledgement message.

15. The method according to claim 9, wherein the session identifier information contains a user identifier and a packet data network identifier.

16. A system for a Bearer Binding and Event Report Function (BBERF) relocation comprising a visited Policy and Charging Rule Function (PCRF), a home PCRF and a Policy and Charging Execution Function (PCEF), wherein after a first IP Connectivity Access Network (IP-CAN) session is established for a User Equipment (UE) in an Evolved Packet System (EPS) and a first gateway control session, a first Gx session, an S9 session and a first subsession of the S9 session that perform policy control on the first IP-CAN session are established, in a process of the BBERF relocation:
the visited PCRF is configured to establish a second subsession of the S9 session with the home PCRF, establish a second gateway control session with a destination BBERF, and link the second gateway control session to the second subsession;
the PCEF is configured to send an IP-CAN session modification indication message or an IP-CAN session establishment indication message to the home PCRF; and the home PCRF is configured to link the first Gx session that the IP-CAN session modification indication message requests to modify to the second subsession based on session identifier information contained in the IP-CAN session modification indication message; and link a second Gx session that the IP-CAN session establishment indication message requests to establish to the second subsession based on session identifier information contained in the IP-CAN session establishment indication message.

17. The method according to claim 16, wherein the session identifier information Contains a user identifier and a packet data network identifier.

18. A system for a Bearer Binding and Event Report Function (BBERF) relocation comprising a visited Policy and Charging Rule Function (PCRF), a home PCRF and a Policy and Charging Execution Function (PCEF), wherein alter a first IP Connectivity Access Network (IP-CAN) session is established for a User Equipment (UE) in an Evolved Packet System (EPS) and a first gateway control session a first Gx session, an S9 session and a first subsession of the S9 session that perform policy control on the first IP-CAN session are established, in a process of the BBERF relocation:

the PCEF is configured to send an IP-CAN session modification indication message or an IP-CAN session establishment indication message to the visited PCRF;

the visited PCRF is configured to establish a second gateway control session with a destination BBERF, and link the first Gx session that the IP-CAN session modification indication message requests to modify to the second getaway control session based on session identifier information contained in the IP-CAN session modification indication message; and establish a second subsession of the S9 session with the home PCRF, and obtain a policy modified by the home PCRF for a user through the second subsession; and link the second Gx session that the IP-CAN session establishment indication message requests to establish to the second gateway control session based on session identifier information contained in the IP-CAN session establishment indication message, and establish the second subsession of the S9 session with the home PCRF, and obtain a policy newly made by the home PCRF for the user through the second subsession;

the home PCRF is configured to newly make the policy for the user and establish the second subsession of the SS session with the visited PCRF.

* * * * *